US012542863B2

United States Patent
Nakajima

(10) Patent No.: US 12,542,863 B2
(45) Date of Patent: Feb. 3, 2026

(54) TRANSMISSION APPARATUS, METHOD OF TRANSMITTING IMAGE DATA IN HIGH DYNAMIC RANGE, RECEPTION APPARATUS, METHOD OF RECEIVING IMAGE DATA IN HIGH DYNAMIC RANGE, AND PROGRAM

(71) Applicant: SATURN LICENSING LLC, New York, NY (US)

(72) Inventor: Yasuhisa Nakajima, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/919,569

(22) Filed: Oct. 18, 2024

(65) Prior Publication Data

US 2025/0097392 A1    Mar. 20, 2025

Related U.S. Application Data

(60) Continuation of application No. 18/243,117, filed on Sep. 7, 2023, now Pat. No. 12,155,978, which is a
(Continued)

(30) Foreign Application Priority Data

Jun. 21, 2013   (JP) .................................. 2013131183
Nov. 29, 2013   (JP) .................................. 2013246876
May 13, 2014   (JP) .................................. 2014100011

(51) Int. Cl.
  *H04N 5/44*   (2011.01)
  *H04N 5/202*   (2023.01)
(Continued)

(52) U.S. Cl.
  CPC ............... *H04N 5/42* (2013.01); *H04N 5/202* (2013.01); *H04N 5/765* (2013.01); *H04N 5/775* (2013.01);
(Continued)

(58) Field of Classification Search
  CPC ........ H04N 5/44; H04N 5/4401; H04N 5/455; H04N 9/69; H04N 7/007; H04N 5/42; H04N 21/43635
(Continued)

(56) References Cited

U.S. PATENT DOCUMENTS 8,248,486 B1    8/2012   Ward et al.
2005/0156869 A1   7/2005   Mori et al.
(Continued)

FOREIGN PATENT DOCUMENTS

CN    101295472    10/2008
CN    101682684    3/2010
(Continued)

OTHER PUBLICATIONS

Nagashima et al., Let's use the differential transmission function of FPGA more easily! Interface, Japan, CQ Publishing Co., Ltd., May 2010, 1, vol. 36 Issue 5, p. 140-148—cited in parent app.
(Continued)

*Primary Examiner* — Sherrie Hsia
(74) *Attorney, Agent, or Firm* — Richard LaPeruta

(57) ABSTRACT

A reception apparatus is provided that comprises circuitry configured to transmit over a transmission path to a transmission apparatus information on a gamma correction method for image data that the reception apparatus is able to support. The reception apparatus further receives image video data for displaying an image over the transmission path from the transmission apparatus, the image video data transmitted in accordance with the gamma correction
(Continued)

method supported by the reception apparatus; receives information on a gamma correction for the image video data over the transmission path from the transmission apparatus; and based on the information on the gamma correction that is received in the information reception unit, processes the HDR image data that is received in the data reception unit. The information on the gamma correction for the image video data includes an indication of the gamma correction method.

20 Claims, 28 Drawing Sheets

Related U.S. Application Data continuation of application No. 17/854,037, filed on Jun. 30, 2022, now Pat. No. 11,792,377, which is a continuation of application No. 16/998,600, filed on Aug. 20, 2020, now Pat. No. 11,418,767, which is a continuation of application No. 16/690,641, filed on Nov. 21, 2019, now Pat. No. 10,791,309, which is a continuation of application No. 16/260,789, filed on Jan. 29, 2019, now Pat. No. 10,531,059, which is a continuation of application No. 15/493,639, filed on Apr. 21, 2017, now Pat. No. 10,225,538, which is a continuation of application No. 15/233,567, filed on Aug. 10, 2016, now Pat. No. 9,667,934, which is a division of application No. 14/374,059, filed as application No. PCT/JP2014/065944 on Jun. 16, 2014, now Pat. No. 9,462,246.

(51) Int. Cl.
  H04N 5/42       (2006.01)
  H04N 5/765      (2006.01)
  H04N 5/775      (2006.01)
  H04N 7/00       (2011.01)
  H04N 9/69       (2023.01)
  H04N 21/426     (2011.01)
  H04N 21/4363    (2011.01)

(52) U.S. Cl.
  CPC .............. *H04N 7/007* (2013.01); *H04N 9/69* (2013.01); *H04N 21/426* (2013.01); *H04N 21/43635* (2013.01)

(58) Field of Classification Search
  USPC ....... 348/474, 725, 726, 476–479, 674, 675; 725/68, 100, 131, 151
  See application file for complete search history.

(56) References Cited

U.S. PATENT DOCUMENTS

| | | |
|---|---|---|
| 2009/0278984 A1 | 11/2009 | Suzuki et al. |
| 2010/0026790 A1 | 2/2010 | Ohba et al. |
| 2010/0073574 A1 | 3/2010 | Nakajima et al. |
| 2010/0128067 A1 | 5/2010 | Lee |
| 2010/0182402 A1 | 7/2010 | Nakajima et al. |
| 2011/0063412 A1 | 3/2011 | Tsukagoshi |
| 2011/0188744 A1 | 8/2011 | Sun |
| 2011/0316973 A1 | 12/2011 | Miller et al. |
| 2013/0107956 A1 | 5/2013 | Muijs et al. |
| 2013/0114000 A1 | 5/2013 | Atkins |
| 2015/0023433 A1 | 1/2015 | Ninan et al. |
| 2016/0100183 A1 | 4/2016 | Yamamoto et al. |

FOREIGN PATENT DOCUMENTS

| | | |
|---|---|---|
| CN | 102741883 | 10/2012 |
| JP | 2005352482 | 12/2005 |
| JP | 2007274065 | 10/2007 |
| JP | 2008236725 | 10/2008 |
| JP | 2009089209 | 4/2009 |
| JP | 2009253789 | 10/2009 |
| JP | 2010004510 | 1/2010 |
| JP | 2012520050 | 8/2012 |
| JP | 2012524317 | 10/2012 |
| JP | 2013093836 | 5/2013 |
| KR | 20060074105 | 7/2006 |
| KR | 20080065820 | 7/2008 |
| KR | 20110090914 | 8/2011 |
| TW | 201142754 | 12/2011 |
| TW | 201215160 | 4/2012 |
| WO | 2012135626 | 10/2012 |
| WO | 2012147010 | 11/2012 |
| WO | 2012153224 | 11/2012 |
| WO | 2013046095 | 4/2013 |

OTHER PUBLICATIONS

Office Action including Search Report for Chinese Application No. 201480033700.9 of Mar. 2, 2018—cited in patent app.
Office action for Taiwanese Patent Application 103120164 mailed Mar. 5, 2018—cited in parent app.
Japanese Office Action for Application No. JP2019019361 Dated Jan. 21, 2020—cited in parent app.
Japanese Office Action for JP Application No. 2015522918, dated Aug. 23, 2018—cited in parent app.
Supplementary European Search Report for App. No. EP14813297 dated Feb. 8, 2017—cited in patent app.
International Application No. PCT/JP2014/065944 dated Sep. 16, 2014—cited in patent app.
High-Definition Multimedia Interface Specification Version 1.4b, Oct. 11, 2011—cited in patent app.
Urushitani et al., Basic Knowledge Useful for Bus, Serial, Image, Storage, Wired, Wireless Interface Standard, Interface, Japan, CQ Publishing Co., Ltd., Feb. 2009, 1, vol. 35 Issue 2, p. 76-87—cited in parent app.
Taiwanese Search Report for TW Patent Application 103120164 mailed Mar. 5, 2018—cited in parent app.

FIG. 12

$$L = a(max[(V + b), 0])^\gamma$$

$$a = (Lw^{1/\gamma} - Lb^{1/\gamma})^\gamma$$

$$b = Lb^{1/\gamma} / (Lw^{1/\gamma} - Lb^{1/\gamma})$$

Lw: Screen_Luminance_White_Level : LUMINANCE WHEN SCREEN LUMINANCE IS 100% (cd/m²)
Lb: Screen_Luminance_Black_Level: LUMINANCE WHEN SCREEN LUMINANCE IS 0% (cd/m²)
γ : Gamat_Value : GAMMA VALUE
V: SCREEN LEVEL
L : SCREEN LUMINANCE

FIG. 14

INFORMATION STRUCTURE EXAMPLE OF HDR OF Vendor Specific Data Block

| Byte# | 7 | 6 | 5 | 4 | 3 | 2 | 1 | 0 |
|---|---|---|---|---|---|---|---|---|
| 0 | Vendor-specific tag code (=3) | | | | | Length (=N) | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI_Dual |
| 7 | Max_TMDS_Clock | | | | | | | |
| 8 | Latency_Fields_Present | I_Latency_Fields_Present | HDMI_Video_Present | HDR Extension | CNC3 | CNC2 | CNC1 | CNC0 |
| (9) | Video_Latency | | | | | | | |
| (10) | Audio_Latency | | | | | | | |
| (11) | Interlaced_Video_Latency | | | | | | | |
| (12) | Interlaced_Audio_Latency | | | | | | | |
| (13) | 3D_Present | | Reserved (0) | | | | | |
| (14) | HDMI_VIC_LEN | | | HDMI_3D_LEN | | | | |
| (15) | (If HDMI_VIC_LEN>0) HDMI_VIC_1 | | | | | | | |
| ... | | | | | | | | |
| (15+M-1) | HDMI_VIC_M | | | | | | | |
| 15+M | Raw | HDR_DC | HDR_FP | HDR_HFR | Reserved (0) | | | |
| 16+M | HDR1 | HDR2 | HDR3 | Reserved (0) | | | | |
| 17+M | Maximum_Panel_Brightness (cd/m2) | | | | | | | |
| 18+M | Maximum_Extended_Range (%) | | | | | | | |
| 19+M...N | Reserved (0) | | | | | | | |

FIG. 15

INFORMATION STRUCTURE EXAMPLE OF HDR OF Vendor Specific InfoFrame

| Byte# | 7 | 6 | 5 | 4 | 3 | 2 | 1 | 0 |
|---|---|---|---|---|---|---|---|---|
| 0 | Checksum | | | | | | | |
| 1...3 | 24bit IEEE Registration Identifier (0x000C03) LSB first | | | | | | | |
| 4 | HDMI_Video_Format | | HDR_Format | Reserved (0) | | | | |
| (5) | 3D_Structure | | | | 3D_Meta_present | Reserved (0) | | |
| (6) | 3D_Ext_Data | | | | Reserved (0) | | | |
| (7) | 3D_Metadata_type | | | 3D_Metadata_Length (=N) | | | | |
| (8) | 3D_Metadata_1 | | | | | | | |
| ... | ... | | | | | | | |
| (7+N) | 3D_Metadata_N | | | | | | | |
| (8+N) | Raw | | HDR_Mode | | | Reserved(0) | | |
| (9+N) | HDR_Meta_Type | | | | Reserved (0) | | | |
| (10+N) | HDR_Gamat_Metadata_Length (=M) | | | | | | | |
| (11+N)...(11+M+N) | HDR_Gamat_Metadata | | | | | | | |

FIG. 16

INFORMATION STRUCTURE EXAMPLE IN WHICH HDR_Meta_Type OF Vendor Specific InfoFrame = 1

| Byte# | 7 | 6 | 5 | 4 | 3 | 2 | 1 | 0 |
|---|---|---|---|---|---|---|---|---|
| (10+N) | | | HDR_Gamat_Metadata_Length (M=9) | | | | | |
| (11+N)...(12+N) | | | Reference_Screen_Luminance_White | | | | | |
| (13+N)...(14+N) | | | Extended_Range_White_Level | | | | | |
| (15+N) | | | Nominal_Black_Level_Value | | | | | |
| (16+N)...(17+N) | | | Nominal_White_Level_Value | | | | | |
| (18+N)...(19+N) | | | Extended_White_Level_Value | | | | | |

FIG. 17

INFORMATION STRUCTURE EXAMPLE IN WHICH HDR_Meta_Type OF Vendor Specific InfoFrame = 2

| Byte# | 7 | 6 | 5 | 4 | 3 | 2 | 1 | 0 |
|---|---|---|---|---|---|---|---|---|
| (10+N) | HDR_Gamat_Metadata_Length (M=13) | | | | | | | |
| (11+N)...(12+N) | Input_Knee_Point (%) | | | | | | | |
| (13+N)...(14+N) | Output_Knee_Point (%) | | | | | | | |
| (15+N)...(18+N) | Dynamic_Range (%) | | | | | | | |
| (19+N)...(22+N) | Dynamic_Range_Luminance (cd/m$^2$) | | | | | | | |

FIG. 18

INFORMATION STRUCTURE EXAMPLE IN WHICH HDR_Meta_Type OF Vendor Specific InfoFrame = 3

| Byte# | 7 | 6 | 5 | 4 | 3 | 2 | 1 | 0 |
|---|---|---|---|---|---|---|---|---|
| (10+N) | HDR_Gamat_Metadata_Length (M=4) | | | | | | | |
| (11+N)…(12+N) | Screen_Luminance_White_Level | | | | | | | |
| (13+N) | Screen_Luminance_Black_Level | | | | | | | |
| (14+N) | Gamat_Value | | | | | | | |

CBUS PACKET FORMAT

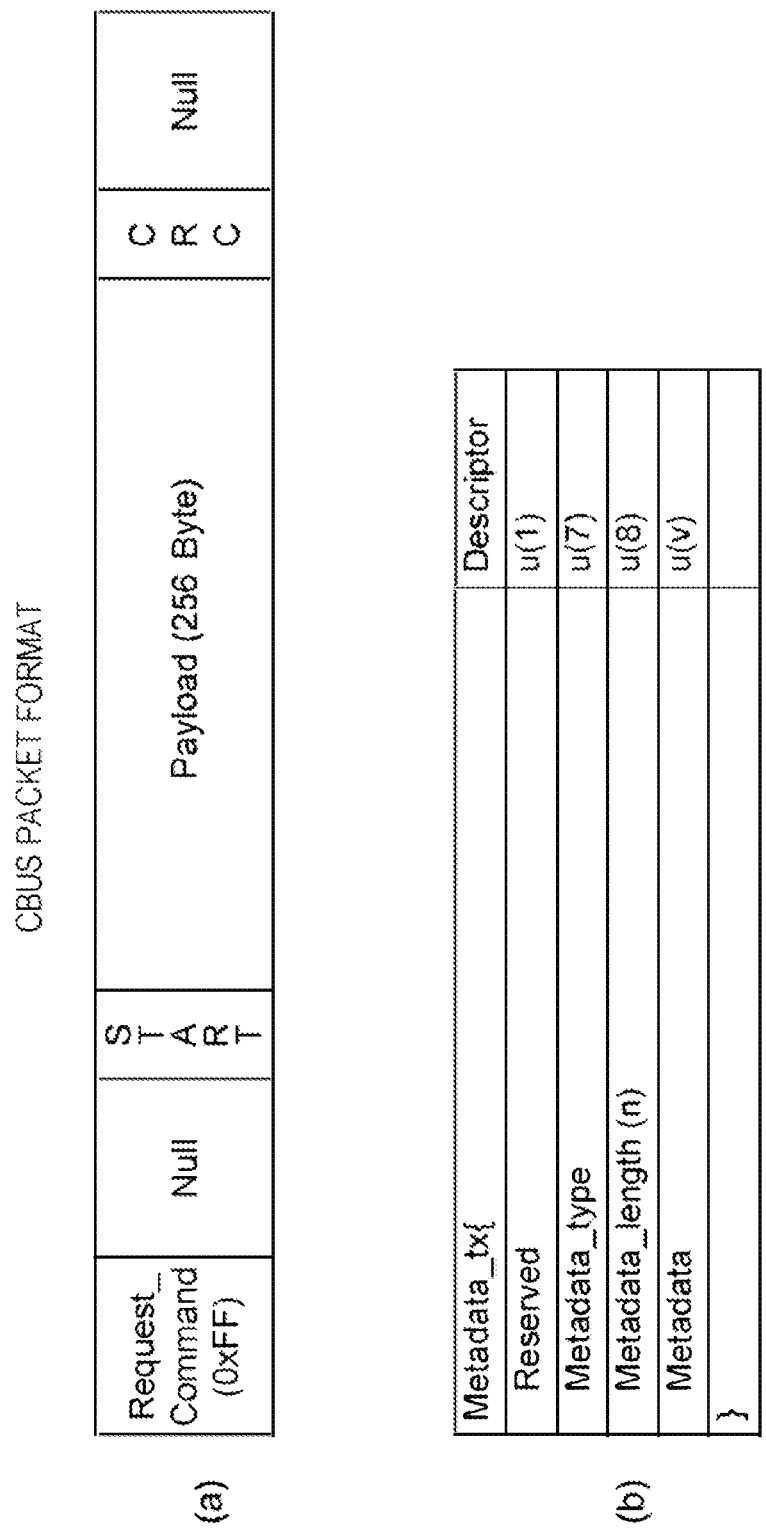

TRANSMISSION APPARATUS, METHOD OF TRANSMITTING IMAGE DATA IN HIGH DYNAMIC RANGE, RECEPTION APPARATUS, METHOD OF RECEIVING IMAGE DATA IN HIGH DYNAMIC RANGE, AND PROGRAM

TECHNICAL FIELD

The present invention relates to a transmission apparatus, a method of transmitting image data in a high dynamic range, a reception apparatus, a method of receiving the image data in the high dynamic range, and a program, and more particularly to a transmission apparatus and the like for transmitting image data in a high dynamic range for displaying an image in the high dynamic range.

BACKGROUND ART

In recent years, for example, a High Definition Multimedia Interface (HDMI) has spread as a communication interface through which a digital picture signal, that is, a non-compressed (baseband) picture signal (image data) and a digital voice signal (voice data) associated with the picture signal, is transmitted at a high speed from a Digital Versatile Disc (DVD) recorder, a set top box, or other Audio Visual (AV) Source to a television receiver, a projector, or other displays. For example, HDMI specifications are described in detail in NPL 1.

For example, an AV system and the like are considered in which a disk player as a source apparatus and a television receiver as a synchronized apparatus are HDMI-connected to each other, but luminance is luminance-adjusted on the assumption that the image data recorded on the disk player is displayed on a display apparatus with a specification such as maximum luminance of 100 cd/m$^2$.

On the other hand, with advances in the technology, the maximum luminance of the display apparatus has been extended in practice to 1,000 cd/m$^2$, exceeding 100 cd/m$^2$ in the related art, and the ability of the display apparatus to perform high-luminance outputting is not put to good use.

Then, High Dynamic Range (HDR) processing is proposed in which luminance dynamic range processing is performed such that processing of the image data with maximum luminance is performed exceeding 100 cd/m$^2$ is proposed and has been extended in practice in terms of capturing of a static image and of post-processing. For example, proposals for a method of recording HDR image data and processing of the HDR image data are put forward in PTL 1.

CITATION LIST

Non Patent Literature

NPL 1: High-Definition Multimedia Interface Specification Version 1.4b, Oct. 11, 2011

PATENT LITERATURE

PTL 1: Japanese Unexamined Patent Application Publication No. 2005-352482

SUMMARY OF INVENTION

Technical Problem

No proposal as to transmission specifications for a high dynamic range in digital interfaces, such as the HDMI, has been put forward in the related art.

An object of the present technology is to satisfactorily enable transmission of image data in a high dynamic range between apparatuses to be performed.

Solution to Problem

A concept of the present technology lies in a transmission apparatus including: a data transmission unit that transmits image data in a high dynamic range to an external apparatus over a transmission path; and an information transmission unit that transmits information on a transmission method for and/or information on gamma correction for the image data in the high dynamic range that is transmitted in the data transmission unit, to the external apparatus over the transmission path.

In the present technology, the data transmission unit transmits the image data in the high dynamic range to the external apparatus over the transmission path. For example, the data transmission unit may transmit the image data in the high dynamic range to the external apparatus over the transmission path using a differential signal.

For example, the image data in the high dynamic range may include first data and second data, and the data transmission unit may configure the first data and the second data into a picture format stipulated for a stereoscopic image, and may transmit the picture format to the external apparatus over the transmission path. Furthermore, for example, the image data in the high dynamic range may include first data and second data, and the data transmission unit may transmit the first data, as a first frame image, to the external apparatus over the transmission path and may transmit the second data, as a second frame image, to the external apparatus over the transmission path.

For example, the image data in the high dynamic range may include first data and second data, and the first data may be low-order 8-bit data of the image data in the high dynamic range and the second data may be high-order bit data of the image data in the high dynamic range, or the first data may be high-order 8-bit data of the image data in the high dynamic range and the second data may be low-order bit data of the image data in the high dynamic range.

The information transmission unit transmits the information on the transmission method for and/or the information on the gamma correction for the image data in the high dynamic range that is transmitted in the data transmission unit, to the external apparatus over the transmission path. For example, the information transmission unit may insert the information on the transmission method for and/or the information on the gamma correction for the image data in the high dynamic range that is transmitted in the data transmission unit, during a blanking period of the image data in the high dynamic range, and thus may transmit the inserted information to the external apparatus. Furthermore, the information transmission unit may transmit the information on the transmission method for and/or the information on the gamma correction for the image data in the high dynamic range that is transmitted in the data transmission unit, to the external apparatus over a control data line that makes up the transmission path.

Furthermore, for example, the information transmission unit may transmit the information on the transmission method for and/or the information on the gamma correction for the image data in the high dynamic range that is transmitted in the data transmission unit, to the external apparatus over a bidirectional communication path that is configured from a predetermined line of the transmission path. In this case, for example, the bidirectional communication path may be a pair of differential communication paths, and at least one of the differential communications paths in the pair may have a function of receiving a connection state notification from the external apparatus using direct-current bias potential.

Furthermore, for example, the information on the transmission method for and the information on the gamma correction for the image data in the high dynamic range that is transmitted in the data transmission unit may include at least one, among information at a maximum white level exceeding 100%, of the image data in the high dynamic range, a bit value at the time of expression at a black level, a bit value at the time of expression at a 100% white level, a flag indicating whether or not processing for the high dynamic range is performed, a luminance level of a reception apparatus that is assumed at the time of the 100% white level, a luminance input level that is necessary for a luminance increase in an image in the high dynamic range, and an increase luminance output level that is necessary for the luminance increase in the image in the high dynamic range.

In the present technology, in this manner, the image data in the high dynamic range is transmitted to the external apparatus over the transmission path, and the information on the transmission method for and/or the information on the gamma correction for the image data in the high dynamic range are transmitted to the external apparatus over the same transmission path. For this reason, in the external apparatus, for example, it can be easily understood which transmission method and which gamma correction method the image data in the high dynamic range is transmitted with, and thus the transmission of the image data in the high dynamic range can be satisfactorily performed.

Moreover, in the present technology, for example, an information reception unit that receives the pieces of information on the transmission method for and/or the gamma correction method for the image data in the high dynamic range that the external apparatus is able to support, which are transmitted from the external apparatus over the transmission path, and a method selection unit that, based on the information on the transmission method and/or the information on the gamma correction method that are received in the information reception unit, selects a predetermined transmission method and/or a predetermined gamma correction method from among the transmission methods for and/or the gamma correction methods for the image data in the high dynamic range which the external apparatus is able to support may further be included, and the data transmission unit may transmit the image data in the high dynamic range in accordance with the transmission method and/or the gamma correction method that are selected in the method selection unit, to the external apparatus over the transmission path.

In this case, the external apparatus can satisfactorily support the transmission method for and/or the gamma correction method for the image data in the high dynamic range that is transmitted to the external apparatus. For this reason, the transmission of the image data in the high dynamic range can be satisfactorily performed.

Furthermore, another concept of the present technology lies in a reception apparatus including: a data reception unit that receives image data in a high dynamic range for displaying an image in the high dynamic range from an external apparatus over a transmission path; an information reception unit that receives information on a transmission method for and/or information on gamma correction for the image data in the high dynamic range which is received in the data reception unit, from the external apparatus; and a data processing unit that, based on the information on the transmission method and/or the information on the gamma correction that are received in the information reception unit, processes the image data in the high dynamic range that is received in the data reception unit.

In the present technology, the data reception unit receives the image data in the high dynamic range for displaying the image in the high dynamic range from the external apparatus over the transmission path. For example, the data reception unit may receive the image data in the high dynamic range from the external apparatus over transmission path using a differential signal.

For example, the image data in the high dynamic range may include first data and second data, and the data transmission and reception unit may receive the first data and the second data, which are configured into a picture format stipulated for a stereoscopic image, from the external apparatus over the transmission path. Furthermore, for example, the image data in the high dynamic range may include first data and second data, and the data transmission and reception unit may receive a first frame image that is configured from the first data and a second frame image that is configured from the second data, from the external apparatus over the transmission path.

For example, the image data in the high dynamic range may include first data and second data, and the first data may be low-order 8-bit data of the image in the high dynamic range and the second data may be high-order bit data of the image in the high dynamic range, or the first data may be high-order 8-bit data of the image data in the high dynamic range and the second data may be low-order bit data of the image data in the high dynamic range.

The information reception unit receives the information on the transmission method for and/or the information on the gamma correction for the image data in the high dynamic range that is received in the data reception unit, from the external apparatus. Then, the data processing unit processes the image data in the high dynamic range that is received in the data reception unit, based on the information on the transmission method and/or the information on the gamma correction that are received in the information reception unit.

For example, the information reception unit may extract the information on the transmission method for and/or the information on the gamma correction for the image data in the high dynamic range from a blanking period of the image data in the high dynamic range that is received in the data reception unit. Furthermore, for example, the information reception unit may receive the information on the transmission method for and/or the information on the gamma correction for the image data in the high dynamic range that is received in the data reception unit, from the external apparatus over a control data line that makes up the transmission path.

Furthermore, for example, the information reception unit may receive the information on the transmission method for and/or the information on the gamma correction for the image data in the high dynamic range that is received in the data reception unit, from the external apparatus over a bidirectional communication path that is configured from a predetermined line of the transmission path. Then, in this case, the bidirectional communication path may be a pair of differential communication paths, and at least one of the differential communications paths in the pair may have a function of notifying the external apparatus of a connection state using direct-current bias potential.

In the present technology, in this manner, the image data in the high dynamic range that is transmitted from a transmitting side is processed based on the information on the transmission method and/or the information on the gamma correction that are transmitted from the same transmitting side, and thus the appropriate processing can be easily performed on the image data in the high dynamic range that is received.

Moreover, in the present technology, for example, a display control unit may further be included that performs a display of whether or not to cancel an energy saving mode, on a display unit, when the information on the transmission method for the image data in the high dynamic range that is transmitted from the external apparatus is received in the information reception unit, if the energy saving mode is selected. Accordingly, it is possible to check a user's intention to confirm whether or not to cancel the energy saving mode.

Furthermore, in the present technology, for example, an information storage unit in which the pieces of information on the transmission method for and/or the gamma correction for the image data in the high dynamic range that the information storage unit itself is able to support are stored, and an information transmission unit that transmits the information on the transmission method and/or the information on the gamma correction method that are stored in the information storage unit, to the external apparatus over the transmission path may further be included. The pieces of information on the transmission method for and/or the gamma correction method for the image data in the high dynamic range that the information storage unit itself can support are transmitted to the transmitting side and thus it is possible to receive the image data in the high dynamic range in accordance with the transmission method and/or the gamma correction method that the information storage unit itself can support, from the transmitting side.

For example, at least one, among information on maximum luminance at which a display is possible, information on a maximum increase luminance level at which processing for the high dynamic range is possible, and a flag for prohibiting increase processing, may further be stored in the information storage unit.

Furthermore, for example, a storage control unit may further be included that rewrites a flag for prohibiting the increase processing as invalid, which is stored in the information storage unit, if the flag for prohibiting increase processing is stored in the information storage unit and an energy saving mode is selected. Furthermore, for example, a storage control unit may further be included that rewrites information on a maximum luminance at which a display is possible and information on a maximum increase luminance level at which the processing for the high dynamic range is possible, which are stored in the information storage unit, if the information on the maximum luminance at which the display is possible and the information on the maximum increase luminance level at which processing for the high dynamic range is possible are stored in the information storage unit and an energy saving mode is selected.

Advantageous Effects of Invention

According to the present technology, the transmission of image data in a high dynamic range can be satisfactorily performed between apparatuses. Moreover, effects described in the present specification are merely examples and thus are not limited to these examples, and additional effects may be present.

BRIEF DESCRIPTION OF DRAWINGS

FIG. 12 is a diagram for describing HDR information (3) that is transmitted with the Vendor Specific InfoFrame packet.

FIG. 14 is a diagram illustrating an example of a data structure of a Vender Specific region of the E-EDID.

FIG. 15 a diagram illustrating an example of a data structure of a Vendor Specific InfoFrame packet of HDMI.

FIG. 16 is a diagram illustrating an example of a data structure of a gamma correction method (1) that is transmitted with the Vendor Specific InfoFrame packet.

FIG. 17 is a diagram illustrating an example of a data structure of a gamma correction method (2) that is transmitted with the Vendor Specific InfoFrame packet.

FIG. 18 is a diagram illustrating an example of a data structure of a gamma correction method (3) that is transmitted with the Vendor Specific InfoFrame packet.

FIG. 28 illustrates a CBUS packet format in a case where the transmission of the information on the transmission method for and the information on the gamma correction for the HDR image data over a CBUS/eCBUS line is performed.

DESCRIPTION OF EMBODIMENTS

Embodiments for reduction to practice of the invention (hereinafter referred to as "embodiments") are described below. Moreover, descriptions are provided as follows.
1. Embodiments
2. Modification Examples

First Embodiment

[Configuration Example of an AV System]

Figure 1:
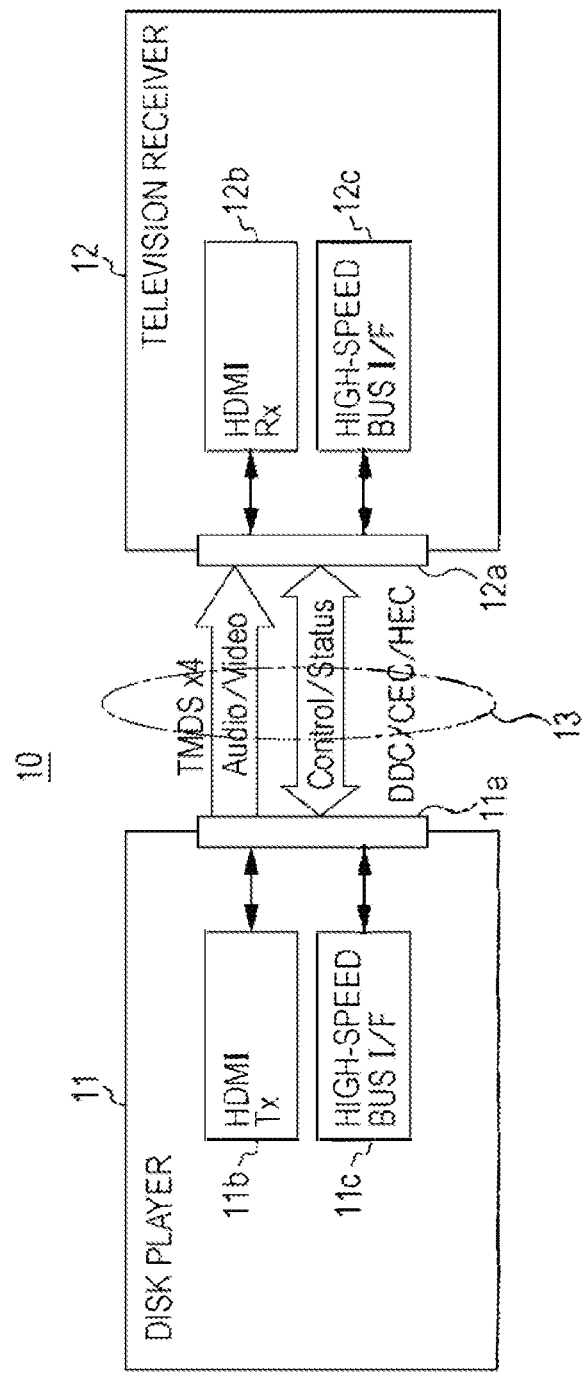
FIG. 1 is a block diagram illustrating a configuration example of an AV system according to an embodiment.

FIG. 1 illustrates a configuration example of an Audio Visual (AV) system 10 according to an embodiment. The AV system 10 has a disk player 11 as a source apparatus and a television receiver 12 as a synchronized apparatus. The disk player 11 and the television receiver 12 are connected to each other over an HDMI cable 13 as a transmission path.

An HDMI terminal 11a, to which an HDMI transmission unit (HDMITX) 11b and a high-speed bus interface (high-speed bus I/F) 11c are connected, is provided to the disk player 11. An HDMI terminal 12a, to which an HDMI reception unit (HDMI RX) 12b and a high-speed bus interface (high-speed bus I/F) 12c are connected, is provided to the television receiver 12. One end of the HDMI cable 13 is connected to the HDMI terminal 11a of the disk player 11, and the other end of HDMI cable 13 is connected to the HDMI terminal 12a of the television receiver 12.

In the AV system 10 illustrated in FIG. 1, non-compressed image data that is reproduced in the disk player 11 and thus is obtained is transmitted to the television receiver 12 over the HDMI cable 13, and an image that results from image data transmitted from the disk player 11 is displayed on the television receiver 12. Furthermore, the non-compressed voice data that is reproduced in the disk player 11 and thus is obtained is transmitted to the television receiver 12 over the HDMI cable 13, and audio that results from voice data transmitted from the disk player 11 is output from the television receiver 12.

Figure 2:
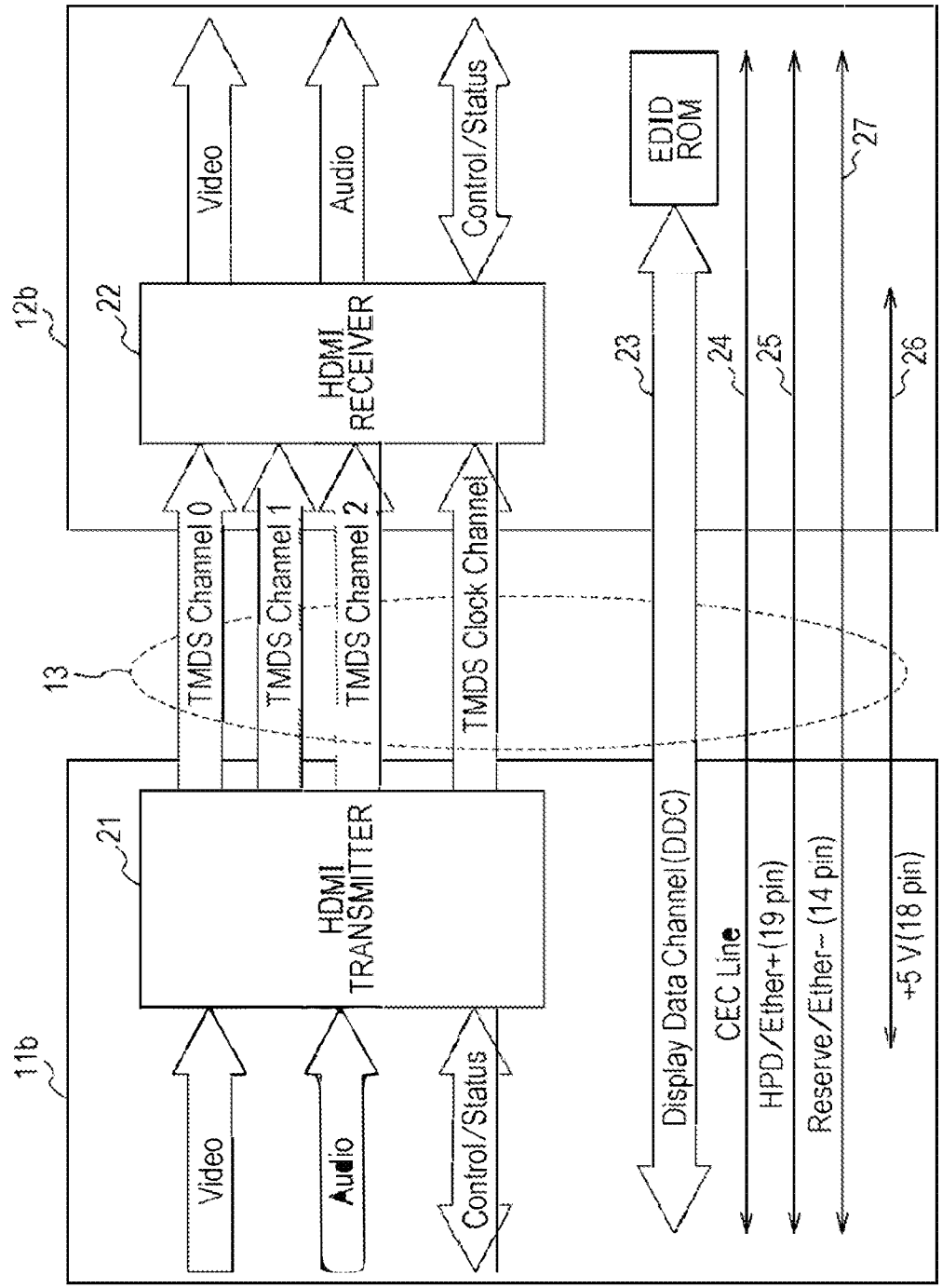
FIG. 2 a block diagram illustrating an example of a configuration of a HDMI transmission unit of a disk player and an HDMI reception unit of a television receiver.

FIG. 2 illustrates an example of a configuration of the HDMI transmission unit 11b of the disk player 11 and the HDMI reception unit 12b of the television receiver 12 in the AV system 10 in FIG. 1. During an effective image period 14 (hereinafter referred to suitably as active video period) (refer to FIG. 3), a period that results from excluding a horizontal blanking period 15 and a vertical blanking period 16 from a period from one vertical synchronization signal to the next vertical synchronization signal, the HDMI transmission unit 11b transmits, a differential signal that corresponds to non-compressed pixel data for an image for one screen, in one direction, to the HDMI reception unit 12b. Furthermore, during the horizontal blanking period 15 and the vertical blanking period 16, the HDMI transmission unit 11b transmits the differential signal that corresponds to voice data or control data that is associated with at least an image, other items of auxiliary data, and the like, to the HDMI reception unit 12b in one direction in multiple channels.

That is, the HDMI transmission unit 11b has an HDMI transmitter 21. The transmitter 21, for example, converts non-compressed image pixel data into the corresponding differential signal, and serial-transmits the result of the conversion to the HDMI reception unit 12b in the multiple channels, three Transition Minimized Differential Signaling (TMDS) channels #0, #1, and #2, in one direction.

Furthermore, the transmitter 21 converts the voice data associated with a non-compressed image, the necessary control data, other items of auxiliary data, and the like into the corresponding differential signal and serial-transmits the result of the conversion to the HDMI reception unit 12b in one direction in the three TMDS channels #0, #1, and #2. Additionally, the transmitter 21 transmits a pixel clock that is synchronized with the pixel data that is transmitted in the three TMDS channels #0, #1, and #2, to the HDMI reception unit 12b in a TMDS clock channel. At this point, 10-bit pixel data is transmitted at one clock that is the pixel clock in one TMDS channel #i (i=0, 1, 2).

During the active video period 14 (refer to FIG. 3), the HDMI reception unit 12b receives the differential signal that is transmitted in one direction from the HDMI transmission unit 11b, and that corresponds to the pixel data, in the multiple channels. Furthermore, during the horizontal blanking period 15 (refer to FIG. 3) or the vertical blanking period 16 (refer to FIG. 3), the HDMI reception unit 12b receives the differential signal that is received in one direction from the HDMI transmission unit 11b, and that corresponds to the voice data or the control data, in the multiple channels.

That is, the HDMI reception unit 12b has an HDMI receiver 22. In the TMDS channels #0, #1, and #2, the receiver 22 receives the differential signal that is received in one direction from the HDMI transmission unit 11b that is connected over the HDMI cable 13 and that corresponds to the pixel data, and the differential signal that corresponds to the voice data or the control data. On this occasion, the differential signals are synchronized with the pixel clock that is similarly transmitted in the TMDS clock channel from the HDMI transmission unit 11b and thus is received.

In addition to the three TMDS channels #0 to #2 as transmission channels for transmitting the pixel data and the voice data and the TMDS clock channel as transmission channels for transmitting the pixel clock, transmission channels for an HDMI system that is configured from the HDMI source transmission unit 11b and the HDMI reception unit 12b include a transmission channel called a Display Data Channel (DDC) 23 or a Consumer Electronic Control (CEC) line 24.

The DDC 23 is made from two signal lines that are included in the HDMI cable 13. The HDMI transmission unit 11b uses the DDC 23 in order to read Enhanced Extended Display Identification Data (E-EDID) from the HDMI reception unit 12b that is connected over the HDMI cable 13. That is, in addition to the HDMI receiver 22, the HDMI reception unit 12b has an EDID Read Only Memory (ROM) in which E-EDID that is capability information relating to its own configuration capability is stored.

The HDMI transmission unit 11b reads, over the DDC 23, the E-EDID on the HDMI reception unit 12b from the HDMI reception unit 12b that is connected over the HDMI cable 13. Then, based on the E-EDID, the HDMI transmission unit 11b recognizes setting of configuration capability of the HDMI reception unit 12b, that is, for example, a format of an image (profile), such as RGB, YCbCr 4:4:4, YCbCr 4:2:2, that an electronic apparatus having the HDMI reception unit 12b supports.

The CEC line 24 is made from one signal line that is included in the HDMI cable 13, and is used to perform bidirectional control data communication between the HDMI transmission unit 11b and the HDMI reception unit 12b. Furthermore, a line (HPD line) 25 that is connected to a pin called Hot Plug Detect (HPD) is included in the HDMI cable 13.

The source apparatus uses the line 25 and thus can detect the connection to the synchronized apparatus using direct-current bias potential. In this case, from the perspective of the source apparatus, the HPD line has a function of receiving a connection state notification from the synchronized apparatus using the direct-current bias potential. On the other hand, from the perspective of the synchronized apparatus, the HPD line has a function of notifying the source apparatus of the connection state using the direct-current bias potential.

Furthermore, a line (power source line) 26 that is used to supply electric power from the source apparatus to the synchronized apparatus is included in the HDMI cable 13. Additionally, a reserve line 27 is included in the HDMI cable 13. In some cases, a pair of differential transmission paths is configured from the HPD line 25 and the reserve line 27 and is used as a bidirectional transmission path.

Figure 3:
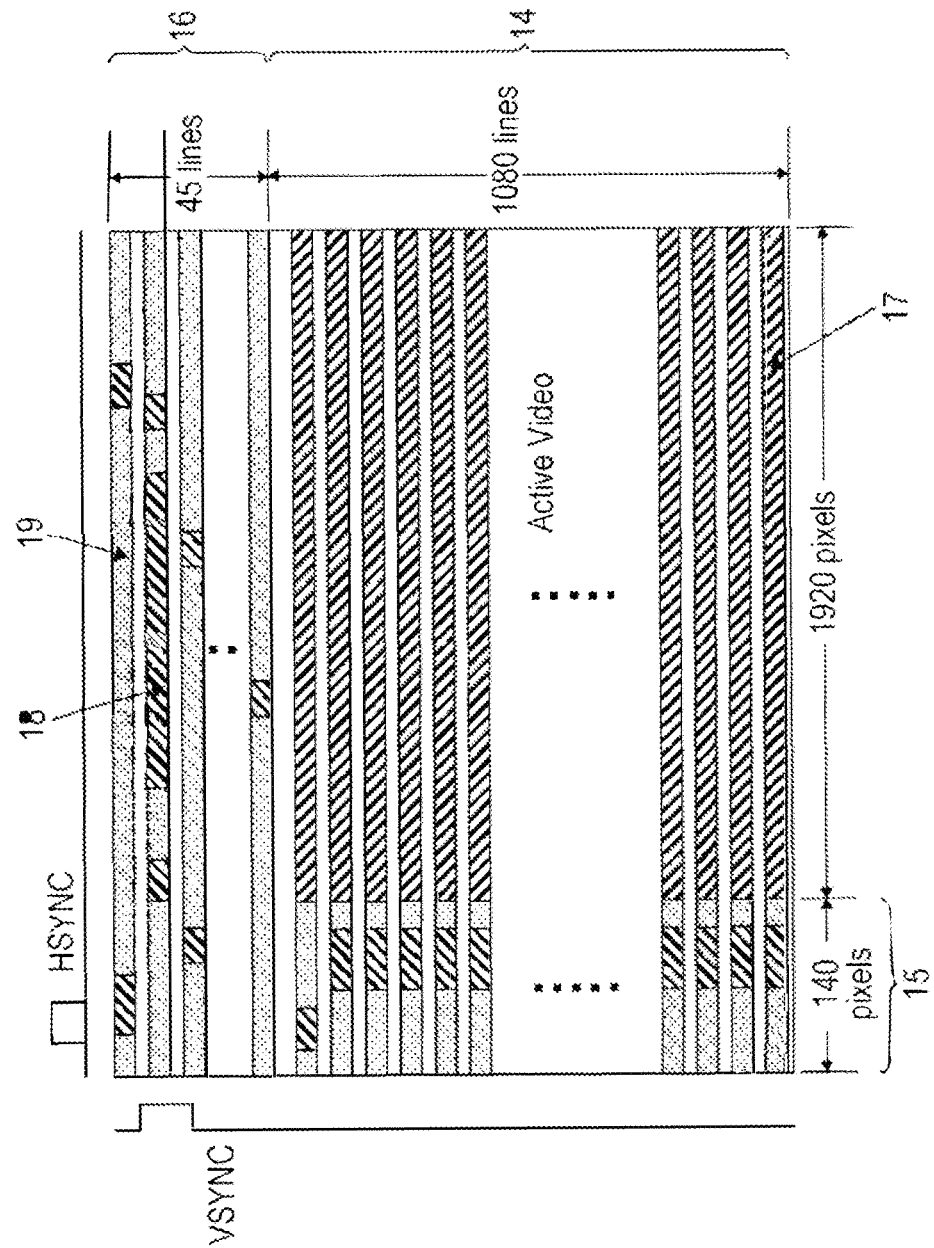
FIG. 3 is a diagram illustrating various transmission data periods that are present when image data of 1,920 rows of pixels and 1,080 lines in columns is transmitted in TMDS channels #0, #1, and #2.

FIG. 3 illustrates various transmission data periods that are present when image data of 1,920 rows of pixels and 1,080 lines in columns is transmitted in the TMDS channels #0, #1, and #2. Three types of period, a video data period 17, a data island period 18, and a control period 19 are present in a video field in which transmission data is transmitted in the three TMDS channels #0, #1, and #2 of the HDMI, depending on types of the transmission data.

At this point, the video field period is a period from an active edge of a certain vertical synchronization signal to an active edge of the next vertical synchronization signal, and is divided into a horizontal blanking period 15, a vertical blanking period 16, and the effective pixel period 14 (active video) that is a period that results from excluding the horizontal blanking period and the vertical blanking period from the video field period.

The video data period 17 is assigned to the effective pixel period 14. During the video data period 17, data on the effective pixel (Active Pixel) for 1920 pixels×1080 lines that makes up non-compressed image data for one image is transmitted. The data island period 18 and the control period 19 are assigned to the horizontal blanking period 15 and the vertical blanking period 16. During the data island period 18 and the control period 19, the auxiliary data is transmitted.

That is, the data island period 18 is assigned to one portion of the horizontal blanking period 15 and of the vertical blanking period 16. During the data island period 18, for example, a voice data packet and the like that are data not relating to the control, among the items of auxiliary data, are transmitted. The control period 19 is assigned to another portion of the horizontal blanking period 15 and of the vertical blanking period 16. During the control period 19, for example, a vertical synchronization signal and a horizontal synchronization signal, a control packet, and the like that are data relating to the control, among the items of auxiliary data, are transmitted.

According to the embodiment, over the HDMI cable 13 the disk player 11 receives, from the television receiver 12, pieces of information on a transmission method for and a gamma correction method for the image data in a high dynamic range that the television receiver 12 can support. The high dynamic range is hereinafter suitably shortened to "HDR". In this case, the television receiver 12 stores in a storage unit pieces of information on the transmission method for and the gamma correction method for HDR image data that the television receiver 12 itself supports, and transmits the information on the transmission method and the information on the gamma correction method to the disk player 11 over the HDMI cable 13. Moreover, in the related art, there is no transmission specification for the HDR image and no compatibility among cameras.

Based on the information on the transmission method and the information on the gamma correction method that are received from the television receiver 12, the disk player 11 selects a predetermined transmission method and a gamma correction method from among transmission methods for the HDR image data that the television receiver can support. In this case, for example, if each of the transmission methods for and the gamma correction methods for the HDR image data that the television receiver 12 can support are two or more in number, the disk player 11 selects the transmission method that is small in image deterioration and the gamma correction method with which the easiest approximation is possible.

The disk player 11 transmits the HDR image data in accordance with the selected transmission method and gamma correction method to the television receiver 12 over the HDMI cable 13. On this occasion, the disk player 11 transmits the information on the method of transmitting the HDR image data to be transmitted and the information on the gamma correction to the television receiver 12 over the HDMI cable 13.

Over the HDMI cable 13, the television receiver 12 receives the HDR image data and receives the information on the transmission method for and the information on the gamma correction for the HDR image data from the disk player 11. The television receiver 12 processes the received HDR image data based on the received information on the transmission method and the information on the gamma correction, and generates the HDR image data for display. Maximum luminance of an object in the natural world is equal to or more than 2,000 cd/m$^2$.

In the related art, for example, luminance is adjusted on the assumption that the image data that is recorded in the disk player is displayed on a display apparatus with a specification of a maximum luminance of 100 cd/m$^2$. In other words, in the related art, the image data is greatly compressed in luminance, compared to a luminance value available in the natural world. Furthermore, the maximum luminance of the display apparatus has been extended in practice to 1,000 cd/m$^2$, exceeding 100 cd/m$^2$ in the related art. When processing that raises a luminance value of the image data originally adjusted to 100 cd/m$^2$ to 1,000 cd/m$^2$ is performed in the display apparatus, a problem of image quality occurs.

The HDR image is proposed in order to realize a high-luminance image in which a white level of luminance is 100% or more. The 100% white level of luminance is normally expressed as a bit value of 235 or 255 in an 8-bit system. 8 or more bits are necessary for gray scale in order to express luminance exceeding the 100% white level of luminance. In other words, the HDR image data is image data that is 10 bits, 12 bits, 16 bits, and the like in length.

Figure 4:
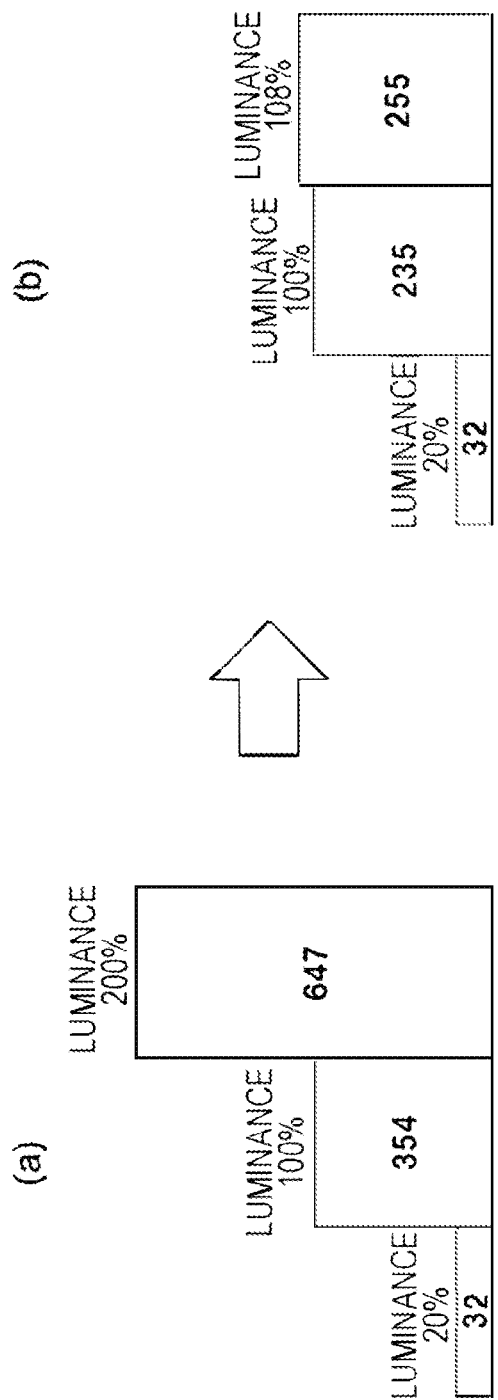
FIG. 4 is a diagram for describing an 8-bit transmission method in the related art.

FIG. 4 is a diagram illustrating an 8-bit transmission method in the related art. FIG. 4(a) illustrates one example of an original white level of 10-bit HDR image data and of a bit value associated with the original white level. FIG. 4(b) illustrates one example of the luminance level of the 8-bit image data that is converted in order to transmit 10-bit HDR image data using the 8-bit transmission method and of the bit value associated with the luminance level. In this case, because a 100% luminance level is assigned to an 8-bit value of "235", 200% luminance is "255" that is a maximum value of the 8-bit value, and luminance compression is performed, thereby resulting in information of which the luminance exceeds 108% being lost.

[Configuration Example of the Disk Player]

Figure 5:
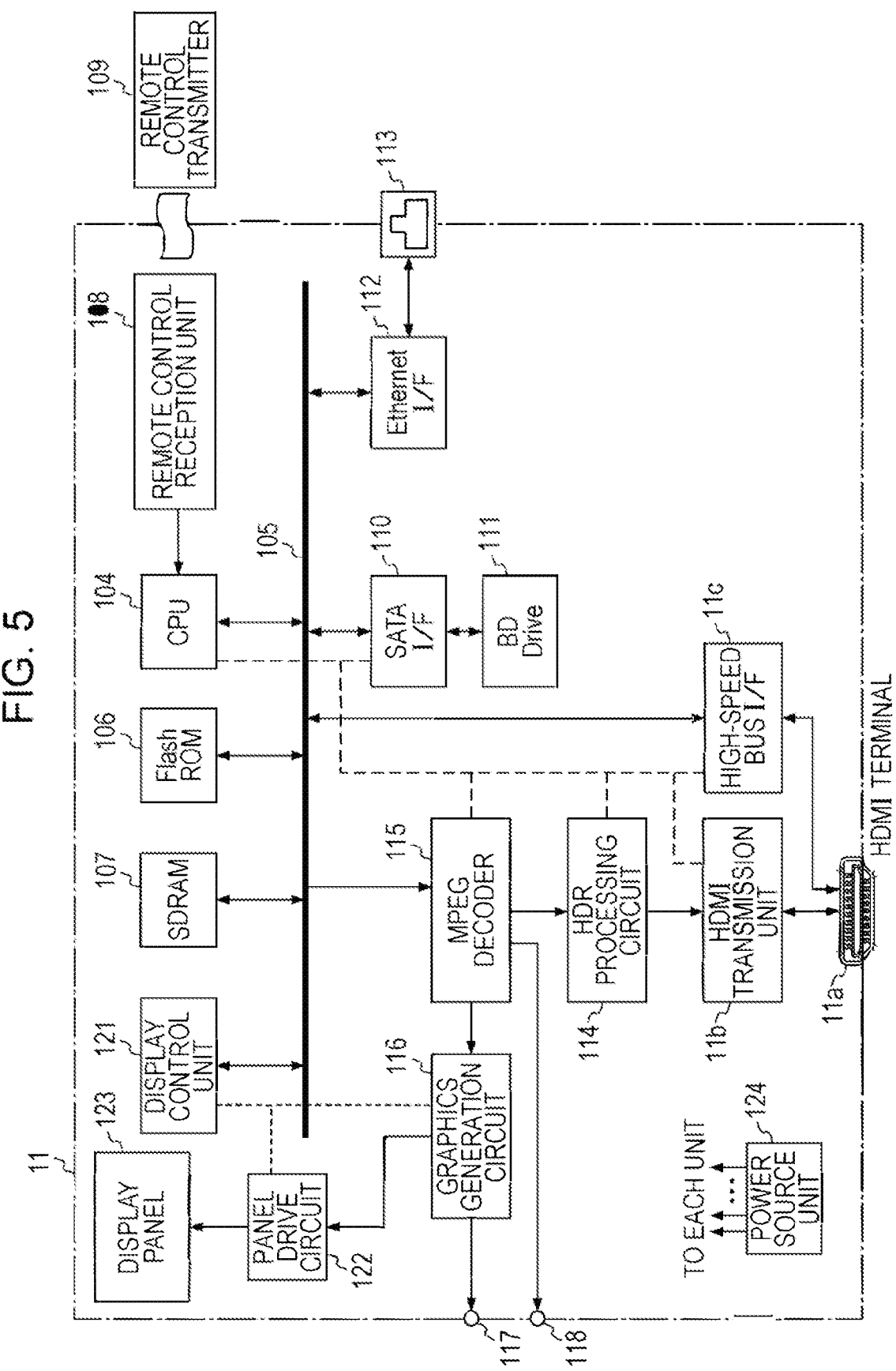
FIG. 5 is a block diagram illustrating a configuration example of a disk player (source apparatus) that makes up an AV system.

FIG. 5 is a configuration example of the disk player 11. The disk player 11 has the HDMI terminal 11a, the HDMI transmission unit 11b, and the high-speed bus interface 11c. Furthermore, the disk player 11 has a Central Processing Unit (CPU) 104, an internal bus 105, a flash Read Only Memory (ROM) 106, a Synchronous Random Access Memory (SDRAM) 107, a remote control reception unit 108, and a remote control transmission unit 109.

Furthermore, the disk player 11 has a Serial Advanced Technology Attachment (SATA) interface 110, a Blu-Ray Disc (BD) drive 111, an Ethernet interface (I/F) 112, and a network terminal 113. Furthermore, the disk player 11 has a Moving Picture Expert Group (MPEG) decoder 115, a graphics generation circuit 116, a picture output terminal 117, a voice output terminal 118, and a HDR processing circuit 114.

Furthermore, the disk player 11 may have a display control unit 121, a panel drive circuit 122, a display panel 123, and a power source unit 124. Moreover, "Ethernet" is a registered trademark. The high-speed bus interface 11c, the CPU 104, the flash ROM 106, the SDRAM 107, the remote control reception unit 108, the SATA interface 110, the Ethernet interface 112, and the MPEG decoder 115 are connected to the internal bus 105.

The CPU 104 controls operation of each unit of the disk player 11. The flash ROM 106 retains control software and stores the data. The SDRAM 107 makes up a work area of the CPU 104. The CPU 104 deploys on the SDRAM 107 the software or the data that is read from the flash ROM 106, starts the software and controls each unit of the disk player 11.

The remote control reception unit 108 receives a remote control signal (remote control code) that is transmitted from the remote control transmission unit 109 and supplies the received remote control signal to the CPU 104. The CPU 104 controls each unit of the disk player 11 according to the remote control code. Moreover, according to the embodiment, the remote control unit is illustrated as the user instruction input unit, but the user instruction input unit may have different configurations, such as a touch panel unit that performs an instruction input using a switch, a wheel, and a proximity/touch, a gesture input unit that detects the instruction input using a mouse, a keyboard, and a camera, and a voice input unit that performs the instruction input using voice.

The BD drive 101 records content data on a BD disc (not illustrated) as a disk-shaped recording media, or reproduces the content data from the BD. The BD drive 111 is connected to the internal bus 105 through the SATA interface 110. The MPEG decoder 115 performs coding processing on an MPEG 2 stream reproduced in the BD drive 111 and thus obtains image data and voice data.

The graphics generation circuit 116 performs convolution processing of graphics data and the like on the image data that is obtained in the MPEG decoder 115, whenever necessary. The picture output terminal 117 outputs the image data that is output from the graphics generation circuit 116. The voice output terminal 118 outputs the voice data that is obtained in the MPEG decoder 115.

The panel drive circuit 122 drives the display panel 123, based on picture (image) data that is output from the graphics generation circuit 260. The display control unit 121 controls the graphics generation circuit 116 or the panel drive circuit 122 and thus controls displaying on the display panel 123. The display panel 123, for example, is configured from a Liquid Crystal Display (LCD), a Plasma Display Panel (PDP), an Organic Electro-Luminescence (EL) panel, or the like.

Moreover, according to the embodiment, the example in which the display control unit 121 is provided outside of the CPU 104 is illustrated, but the CPU 104 may directly control the displaying on the display panel 123. Furthermore, the CPU 104 and the display control unit 121 may be integrated into one chip, and may be multiple cores. The power source unit 124 supplies electric power to each unit of the disk player 11. The power source unit 124 may be an AC power source and a battery (a storage battery or a dry cell battery).

With communication in compliance with HDMI, the HDMI transmission unit (HDMI source) 11b outputs the image (picture) data or the voice data with a baseband from the HDMI terminal 11a. The high-speed bus interface 11c is an interface for the bidirectional communication path that is configured from predetermined lines (a reserve line and a HPD line according to the embodiment) that make up the HDMI cable 13.

The high-speed bus interface 11c is inserted between the Ethernet interface 112 and the HDMI terminal 101. The high-speed bus interface 11c transmits the transmission data that is supplied from the CPU 104, from the HDMI terminal 101 to the other party's apparatus over the HDMI cable 13. Furthermore, the high-speed bus interface 11c supplies reception data received from the other party's apparatus through the HDMI terminal 11a from the HDMI cable 13 to the CPU 104.

When the HDR image data for displaying the HDR image, among the items of the image data that are obtained in the MPEG decoder 115, is transmitted in the TMDS channel of HDMI, the HDR processing circuit 114 processes the HDR image data into a state in accordance with the transmission method. At this point, the HDR image data is configured in compliance with a deep color image format, or is configured in compliance with a stereoscopic image data format, or is configured in compliance with a high frame graphics format. The HDR processing circuit 114 and the HDMI transmission unit 11b, although integrated into one chip, may be multiple cores. Types of the transmission methods for the HDR image data, selection of the transmission method, a packet formation of each method, and the like are described in detail below.

Operation of the disk player 11 illustrated in FIG. 5 is briefly described. At the time of the recording, content data is obtained through a digital tuner not illustrated, the Ethernet interface 112 from the network terminal 113, or the high-speed bus interface 11c from the HDMI terminal 11a. The content data is input into the SATA interface 110 and is recorded on a BD by the BD drive 111. In some cases, the content data may be recorded on a hard disk drive (HDD) connected to the SATA interface 110, which is not illustrated.

At the time of the reproducing, the content data (MPEG stream) that is reproduced from the BD by the BD drive 111 is supplied to the MPEG decoder 115 through the SATA interface 110. In the MPEG decoder 115, decoding processing is performed on the reproduced content data, and the image data or the voice data with the baseband. The image data is output to the picture output terminal 117 through the graphics generation circuit 116. Furthermore, the voice data is output to the voice output terminal 118.

Furthermore, at the time of the reproducing, according to a user's operation, the image data obtained in the MPEG decoder 115 is supplied to the panel drive circuit 122 through the graphics generation circuit 116, and a reproduction image is displayed on the display panel 123. Furthermore, according to the user's operation, the voice data obtained in the MPEG decoder 115 is supplied to a speaker not illustrated, and voice that corresponds to the reproduction image is output.

Furthermore, at the time of the reproducing, if the image data or the voice data obtained in the MPEG decoder 115 are transmitted in the TMDS channel of HDMI, the image data and the voice data are supplied to the HDMI transmission unit 11b, and thus are packed and are output from the HDMI transmission unit 11b to the HDMI terminal 11a.

Moreover, if the image data is the HDR image data, the HDR image data is processed, by the HDR processing circuit 114, into the state in accordance with the selected transmission method and then is supplied to the HDMI transmission unit 11b. Furthermore, at the time of the reproducing, when the content data reproduced in the BD drive 111 is sent to a network, the content data is output to the network terminal 113 through the Ethernet interface 112. In the same manner, at the time of the reproducing, when the content data reproduced in the BD drive 111 is sent to the bidirectional communication path of the HDMI cable 13, the content data is output to the HDMI terminal 11a through the high-speed bus interface 11c. At this point, before outputting the image data, the image data may be encoded using a copyright protection technology, such as HDCP, DTCP, and DTCP+, and thus be transmitted.

[Configuration Example of the Television Receiver]

Figure 6:
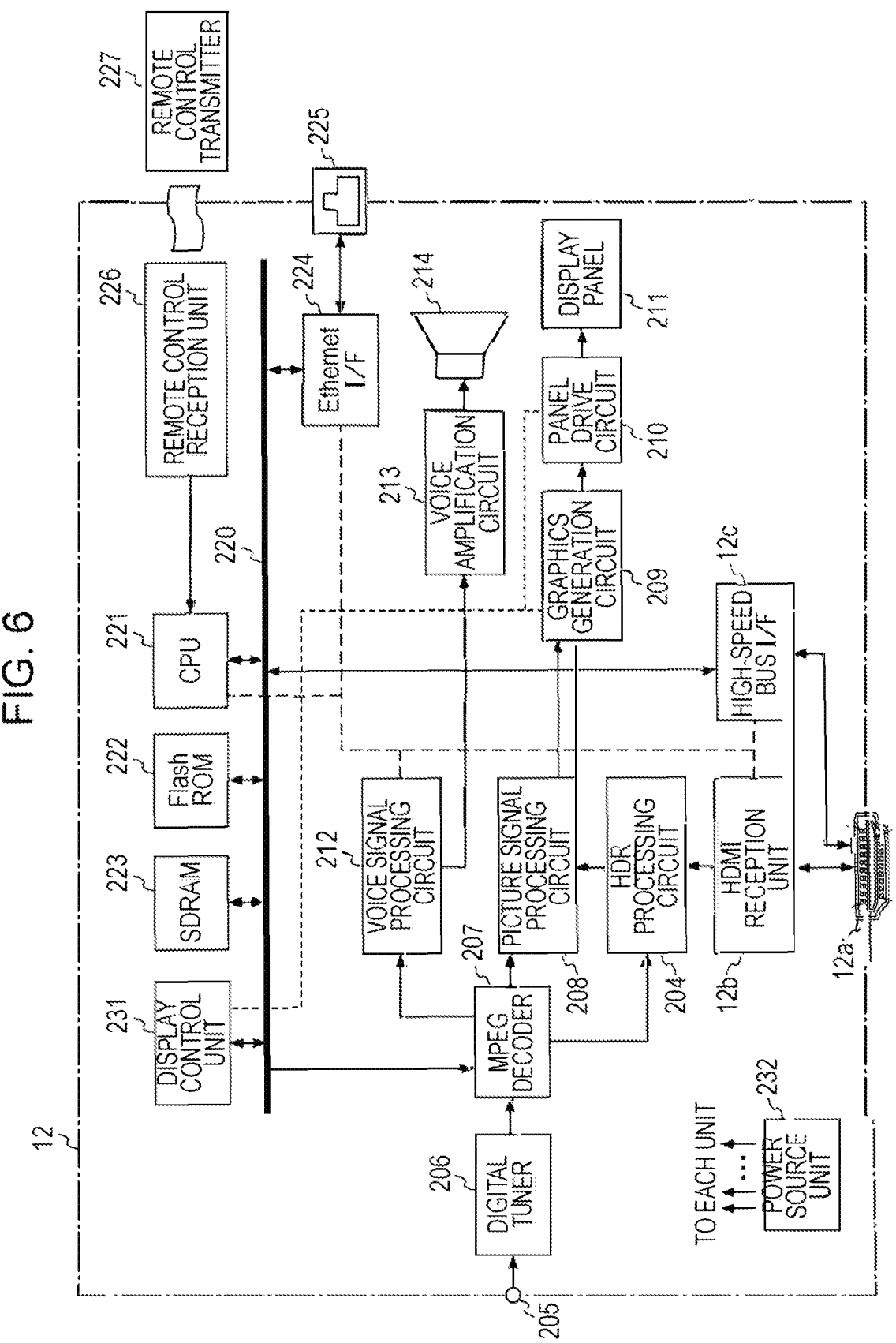
FIG. 6 is a block diagram illustrating a configuration example of a television receiver (synchronized apparatus) that makes up the AV system.

FIG. 6 illustrates a configuration example of the television receiver 12. The television receiver 12 has the HDMI terminal 12a, the HDMI reception unit 12b, the high-speed bus interface 12c, and the HDR processing circuit 204. Furthermore, the television receiver 12 has an antenna terminal 205, a digital tuner 206, an MPEG decoder 207, a picture signal processing circuit 208, a graphics generation circuit 209, a panel drive circuit 210, and a display panel 211.

Furthermore, the television receiver 12 has a voice signal processing circuit 212, a voice amplification circuit 213, a speaker 214, an internal bus 220, a CPU 221, a flash ROM 222, and a synchronous random access memory (SDRAM) 223. Furthermore, the television receiver 12 has an Ethernet interface (I/F) 224, a network terminal 225, a remote control reception unit 226, and a remote control transmission unit 227. Furthermore, the television receiver 12 has a display control unit 231 and the power source unit 232. Moreover, "Ethernet" is a registered trademark.

The antenna terminal 205 is a terminal into which to input a television broadcasting signal received in a reception antenna (not illustrated). The digital tuner 206 processes the television broadcasting signal that is input into the antenna terminal 205 and thus extracts a partial Transport Stream (TS) (TS packets of the picture image, and TS packets of the voice data) from a predetermined transport stream that corresponds to a channel selected by the user.

Furthermore, the digital tuner 206 takes Program Specific Information/Service Information (PSI/SI) out of the obtained transport stream, and outputs the PSI/SI to the CPU 221. Processing that extracts the partial TS in an arbitrary channel from the multiple transport streams obtained in the digital tuner 206 is possible by obtaining information on a packet ID (PID) in the arbitrary channel from the PSI/SI (PAT/PMT).

The MPEG decoder 207 performs the decoding processing on a picture packetized Elementary Stream (PES) that is configured from the TS packets of the picture data that are obtained in the digital tuner 206, and thus obtains the image data. Furthermore, the MPEG decoder 207 performs the decoding processing on a voice PED packet that is configured from the TS packet of the voice data that is obtained in the digital tuner 206, and thus obtains the voice data.

The picture signal processing circuit 208 and the graphics generation circuit 209 perform scaling processing (resolution conversion processing), convolution processing of the graphics data, the gamma correction of the HDR image data, and the like on the image data obtained in the MPEG decoder 207 or the image data received in an HDMI reception unit 202, whenever necessary.

The panel drive circuit 210 drives the display panel 211, based on the picture (image) data that is output from the graphics generation circuit 209. The display control unit 231 controls the graphics generation circuit 209 or the panel drive circuit 210 and thus controls the displaying on the display panel 211. The display panel 211, for example, is configured from a Liquid Crystal Display (LCD), a Plasma Display Panel (PDP), an Organic Electro-Luminescence (EL) panel, or the like.

Moreover, according to the embodiment, the example in which the display control unit 231 is provided in addition to the CPU 221 is illustrated, but the CPU 221 may directly control the displaying on the display panel 211. Furthermore, the CPU 221 and the display control unit 231 may be integrated into one chip, and may be multiple cores. The power source unit 232 supplies electric power to each unit of the television receiver 12. The power source unit 232 may be an AC power source and a battery (a storage battery or a dry cell battery).

The voice signal processing circuit 212 performs necessary processing, such as D/A conversion, on the voice data obtained in the MPEG decoder 207. The voice amplification circuit 213 amplifies a voice signal that is output from the voice signal processing circuit 212, and thus supplies the amplified voice signal to a speaker 214. Moreover, the speaker 214 may be monophonic or stereophonic. Furthermore, there may be one or there may be two or more speakers 214. Furthermore, the speaker 214 may be earphones or headphones. Furthermore, the speaker 214 may correspond to 2.1 channels, 5.1 channels, and the like. Furthermore, the speaker 214 may be connected to the television receiver 12 in a wireless manner. Furthermore, the speaker 214 may be another apparatus.

The CPU 221 controls operation of each unit of the television receiver 12. The flash ROM 222 retains control software and stores the data. The DRAM 223 makes up a work area of the CPU 221. The CPU 221 deploys on the SDRAM 223 software and data that are read from the flash ROM 222, and thus starts the software and controls each unit of the television receiver 12.

The remote control reception unit 226 receives the remote control signal (remote control code) that is transmitted from the remote control transmission unit 227 and supplies the received remote control signal to the CPU 221. The CPU 221 controls each unit of the television receiver 12, based on the remote control code. Moreover, according to the embodiment, the remote control unit is illustrated as the user instruction input unit, but the user instruction input unit may have different configurations, such as a touch panel unit that performs an instruction input using proximity/touch, a gesture input unit that detects an instruction input using a mouse, a keyboard, and a camera, and a voice input unit that performs the instruction input using voice.

The network terminal 225 is a terminal that is connected to the network, and is connected to the Ethernet interface 224. The high-speed bus interface 12c, the CPU 221, the flash ROM 222, the SDRAM 223, the Ethernet interface 224, the MPEG decoder 207, and the display control unit 231 are connected to the internal bus 220.

With the communication in compliance with HDMI, the HDMI reception unit (HDMI synchronization) 12b receives the image (picture) data or the voice data with the baseband, which is supplied to the HDMI terminal 12a over the HDMI cable 13. Like the high-speed bus interface 11c of the disk player 11 described above, the high-speed bus interface 12c is an interface for the bidirectional communication path that is configured from predetermined lines (the reserve line and the HPD line according to the embodiment) that make up the HDMI cable 13.

The high-speed bus interface 12c is inserted between the Ethernet interface 224 and the HDMI terminal 201. The high-speed bus interface 12c transmits the transmission data that is supplied from the CPU 221, from the HDMI terminal 12a to the other party's apparatus over the HDMI cable 13. Furthermore, the high-speed bus interface 12c supplies the reception data received from the other party's apparatus through the HDMI terminal 12a from the HDMI cable 13 to the CPU 221.

If the image data received in the HDMI reception unit 202 is the HDR image data, the HDR processing circuit 204 performs processing (decoding processing) that corresponds to the transmission method, on that HDR image data, and thus generates the HDR image data. That is, the HDR processing circuit 204 performs reverse processing to the processing by the HDR processing circuit 114 of the disk player 11 described above, and thus obtains data that makes up the HDR image data. The HDR processing circuit 204 and the HDMI reception unit 202, or the HDR processing circuit 204 and the picture signal processing circuit 208 may be integrated into one chip, or may be multiple cores.

Furthermore, the HDR processing circuit 204 performs an arithmetic operation that generates the HDR image data from first data that is configured from low-order 8-bit image data of the HDR image and second data that is configured from high-order 8-bit image data of the HDR image, or from first data that is configured from the high-order 8-bit image data of the HDR image and second data that is configured from the low-order 8-bit image data of the HDR image.

Moreover, for example, when the received content data is sent to a network, the content data is output to the network terminal 225 through the Ethernet interface 224. In the same manner, when the received content data is sent to the bidirectional communication path of the HDMI cable 13, the content data is output to the HDMI terminal 11a through the high-speed bus interface 12c. At this point, before outputting the image data, the image data may be encoded using the copyright protection technology, such as HDCP, DTCP, and DTCP+, and thus be transmitted.

Operation of the television receiver 12 illustrated in FIG. 6 is briefly described. The television broadcasting signal that is input into the antenna terminal 205 is supplied to the digital tuner 206. In the digital tuner 206, the television broadcasting signal is processed, a predetermined transport stream that corresponds to the channel selected by the user is output, a partial Transport Stream (TS) (the TS packets of the picture image, and the TS packets of the voice data) is extracted from the transport stream, and the partial TS is supplied to the MPEG decoder 207.

In the MPEG decoder 207, the decoding processing is performed on a picture PES packet that is configured from the TS packet of the picture data, and thus the picture data is obtained. The scaling processing (resolution conversion processing), and the convolution processing of the graphics data are performed on the picture data, whenever necessary, in the picture signal processing circuit 208 and the graphics generation circuit 209, and then the picture data is supplied to the panel drive circuit 210. For this reason, the image that corresponds to the channel selected by the user is displayed on the display panel 211.

Furthermore, in the MPEG decoder 207, the decoding processing is performed on a voice PES packet that is configured from the TS packet of the voice data, and thus the voice data is obtained. Necessary processing such as the D/A conversion is performed on the voice data in the voice signal processing circuit 212, the voice data is additionally amplified by the voice amplification circuit 213, and then the voice data is supplied to the speaker 214. For this reason, the voice that corresponds to the channel selected by the user is output from the speaker 214.

Furthermore, the content data (the image data and the voice data), which is supplied from the network terminal 225 to the Ethernet interface 224, or which is supplied from the HDMI terminal 12a through the high-speed bus interface 12c, is supplied to the MPEG decoder 207. Subsequently, the same operation as when the television broadcasting signal is received is performed, and thus the image is displayed on the display panel 211 and the voice is output from the speaker 214.

Furthermore, in the HDMI reception unit 12b, the image data and the voice data are obtained that are transmitted from the disk player 11 that is connected to the HDMI terminal 12a over the HDMI cable 13. The image data is supplied to the picture signal processing circuit 208 through the HDR processing circuit 204. Furthermore, the voice data is supplied directly to the voice signal processing circuit 212. Subsequently, the same operation as when the television broadcasting signal is received is performed, and thus the image is displayed on the display panel 211 and the voice is output from the speaker 214.

Moreover, if the image data received in the HDMI reception unit 12b is the HDR image data, in the HDR processing circuit 204, the processing (decoding processing) that corresponds to the transmission method is performed on that HDR image data, and thus the HDR image data is generated. Then, the HDR image data is supplied from the HDR processing circuit 204 to the picture signal processing unit 208. Furthermore, in the picture signal processing circuit 208, if the HDR image data is supplied, the image data for displaying the HDR image is generated based on the HDR image data, and the gamma correction is performed based on the information on the gamma correction that is received in the HDMI reception unit 12b. For this reason, the HDR image is displayed on the display panel 211.

[Transmission Method for the HDR Image Data]

Next, the transmission method for the HDR image data is described. First, a case where the HDR image data on an original signal is configured from the image data that is 8 or more bits in length is described. At this point, as illustrated in FIGS. 7 to 9, a case where each item of HDR image data in FIGS. 7 to 9 is image data in the 1,920×1,080p pixel format is described.

It is considered that when the original signal is transmitted with a baseband digital interface, for example, the following three transmission methods are used. These methods are the most desirable methods because the transmission is possible without decreasing a grade of an original signal. However, because a transmission band needs to be 1.2 times or more the image data in the 1,920×1,080p 8-bit pixel format, the transmission is possible when there is room in the transmission band.

Figure 7:
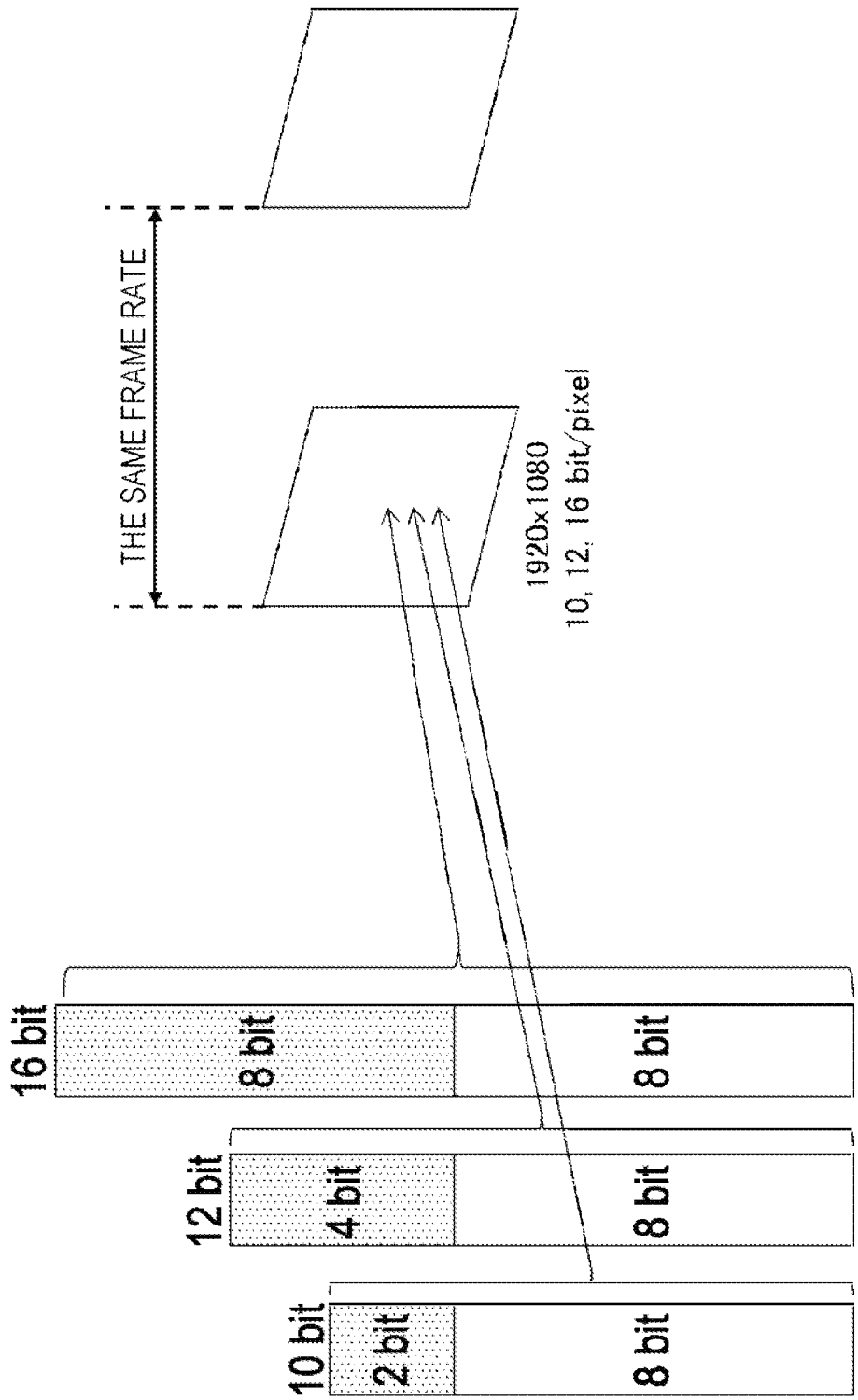
FIG. 7 is a diagram for describing a transmission method (1) of transmitting HDR image data using a deep color transmission format.

The transmission method (1) is a method in which the transmission is performed using a deep color transmission format as illustrated in FIG. 7. In this case, the 1,920×1,080p pixel format is selected for the image format, and information that assigns the number of bits per one pixel as any one of "DC-48 bit", "DC-36 bit", and "DC-30 bit" that are described below, and the information on the HDR transmission to be defined afresh are transmitted together. In this case, because all pieces of pixel data cannot be transmitted with one pixel block, pixel mapping processing is necessary in the HDR processing circuit 114 or the HDMI transmission unit 11b.

Figure 8:
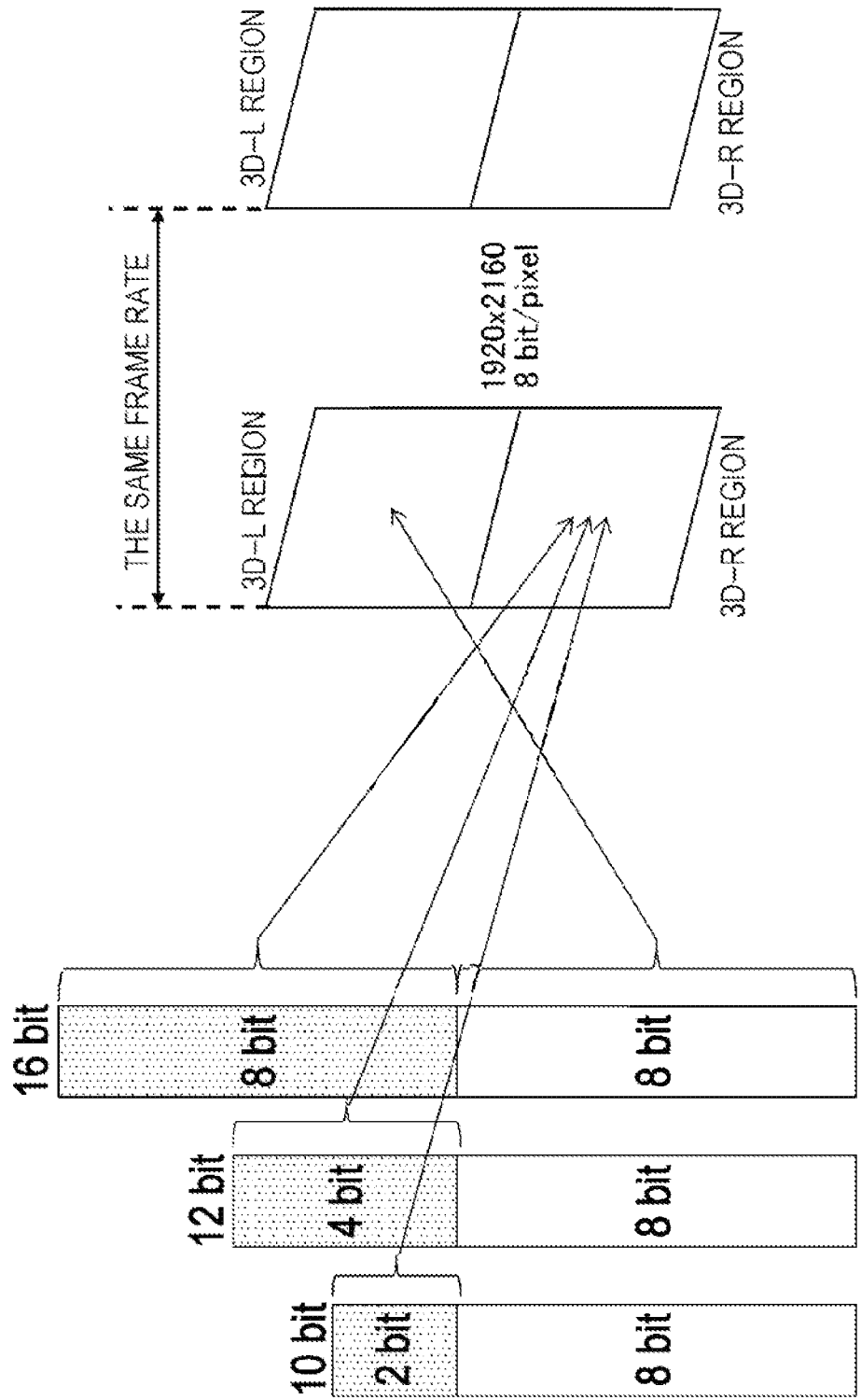
FIG. 8 is a diagram for describing a transmission method (2) of transmitting the HDR image data using a stereoscopic picture format.
Figure 9:
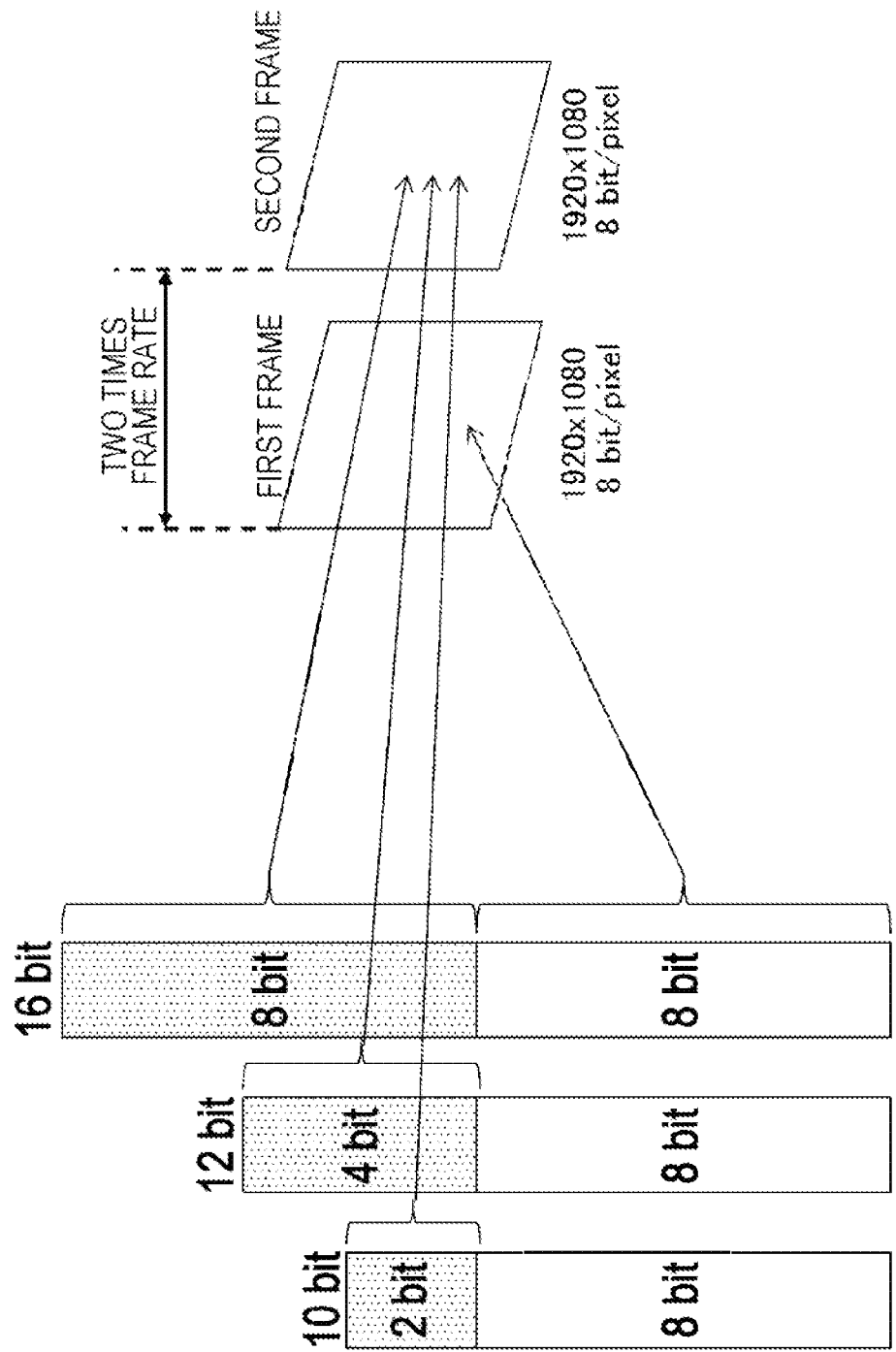
FIG. 9 is a diagram for describing a transmission method (3) of transmitting the HDR image data using a picture format for a high frame rate.

In the transmission method (2), as illustrated in FIG. 8, low-order 8 bits of the HDR image data are arranged in a left eye image data region in a stereoscopic picture format, and the remaining high-order bits of the HDR image data are arranged in a right eye image data region in the stereoscopic picture format, and thus the HDR image data is transmitted. In this case, a picture format called 1,920×1,080p frame packing is designated as the picture format, and is transmitted together with the information on the HDR transmission method to be defined afresh without designating the stereoscopic picture format. In this case, slice processing of the low-order 8-bit image data and the high-order bit image data and processing for bit mapping to a predetermined stereoscopic picture format are necessary in the HDR processing circuit 114.

Moreover, the description is provided above to the effect that the remaining high-order bits of the HDR image data are arranged in the left eye image data region in the stereoscopic picture format and thus are transmitted. That is, when the HDR image data is 10-bit image data, 12-bit image data, and 16-bit image data, the remaining high-order bits of the HD image data are 2 bits, 4 bits, and 8 bits, respectively. It is also considered that instead of the remaining high-order bits, the high-order 8 bits of the HDR image data are arranged in the right eye image data region in the stereoscopic picture format and thus are transmitted.

Furthermore, the description is provided above to the effect that the low-order 8 bits of the HDR image data are arranged in the left eye image data region in the stereoscopic picture format, and the remaining high-order bits of the HDR image data are arranged in a right eye image data region in the stereoscopic picture format, and thus the HDR image data is transmitted. However, it is also considered that the low-order 8 bits of the HDR image data are arranged in the left eye image data region in the stereoscopic picture format, and the remaining high-order bits of the HDR image data are arranged in a right eye image data region in the stereoscopic picture format, and thus the HDR image data is transmitted.

Furthermore, the description is provided above to the effect that the low-order 8 bits of the HDR image data are arranged in the left eye image data region in the stereoscopic picture format, and the remaining high-order bits of the HDR image data are arranged in a right eye image data region in the stereoscopic picture format, and thus the HDR image data is transmitted. However, it is also considered that the high-order 8 bits of the HDR image data are arranged in the left eye image data region in the stereoscopic picture format, and the remaining low-order bits of the HDR image data are arranged in the right eye image data region in the stereoscopic picture format, and thus the HDR image data is transmitted.

The transmission method (3) is a transmission method in which, as illustrated in FIG. 9, the low-order 8 bits of the HDR image data are arranged in a first frame image data region with a high frame rate, and the remaining high-order bits of the HDR image data are arranged in a second frame image data region, and thus the HDR image data is transmitted. In this case, a normal 1,920×1,080p picture format for a high frame rate is designated as the picture format, and is transmitted together with the information on the HDR transmission method to be defined afresh. In this case, the slice processing of the low-order 8-bit image data and the high-order bit image data and the processing for bit mapping to a predetermined image format for the high frame rate are necessary in the HDR processing circuit 114.

Moreover, the description is provided above to the effect that the remaining high-order bits of the HDR image data are arranged in the second frame image data region and thus are transmitted. That is, when the HDR image data is 10-bit image data, 12-bit image data, and 16-bit image data, the remaining high-order bits of the HD image data are 2 bits, 4 bits, and 8 bits, respectively. It is also considered that instead of the remaining high-order bits, the high-order 8 bits of the HDR image data is arranged in the second frame image data region and thus are transmitted.

Furthermore, the description is provided above to the effect that the low-order 8 bits of the HDR image data are arranged in the first frame image data region with the high frame rate, and the remaining high-order bits of the HDR image data are arranged in the second frame image data region, and thus the HDR image data is transmitted. However, it is also considered that the low-order 8 bits of the DR image data are arranged in the second frame image data region with the high frame rate, and the remaining high-order bits of the HDR image data are arranged in the first frame image data region, and thus the HDR image data is transmitted.

Furthermore, the description is provided above to the effect that the low-order 8 bits of the HDR image data are arranged in the first frame image data region with the high frame rate, and the remaining high-order bits of the HDR image data are arranged in the second frame image data region, and thus the HDR image data is transmitted. However, it is also considered that the high-order 8 bits of the HDR image data are arranged in the first frame image data region with the high frame rate, and the remaining low-order bits of the HDR image data are arranged in the second frame image data region, and thus the HDR image data is transmitted.

Moreover, in the cases of the transmission methods (2) and (3), the HDR processing circuit 204 of the television receiver 12, described above, performs processing that separately extracts the low-order 8 bits of the HDR image data and the high-order bits, or the high-order 8-bits and the low-order bits, from the stereoscopic picture format or from the picture format for the high frame rate, respectively.

[Gamma Correction Method for the HDR Image Data]

Next, a gamma correction method for HDR image data is described.

Figure 10:
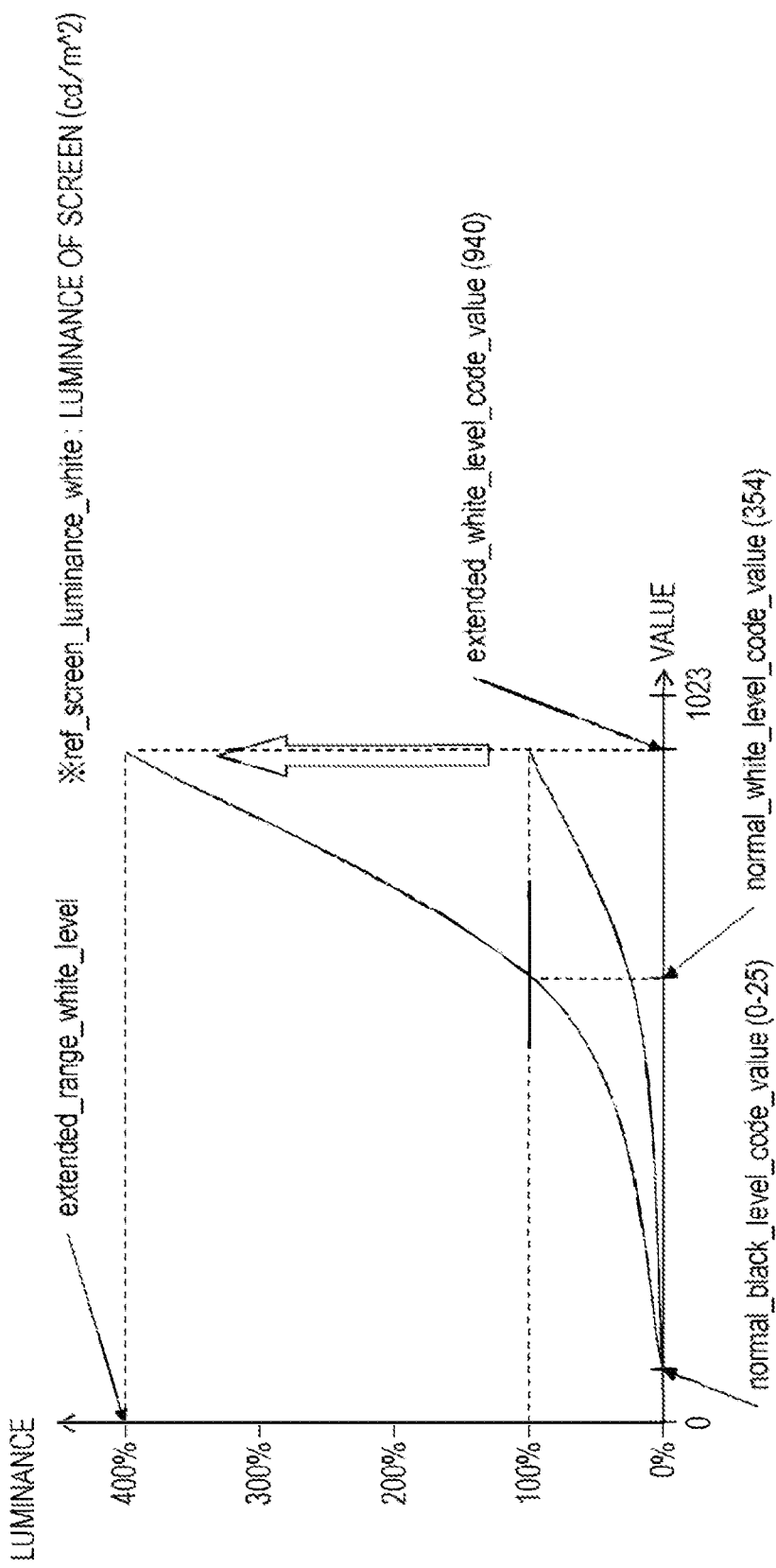
FIG. 10 is a diagram for describing HDR information (1) that is transmitted with a Vendor Specific InfoFrame packet.

In the gamma correction method (1), as illustrated in FIG. 10, a gamma correction curve can be approximated by assigning a luminance level of the display panel 211 that is assumed at the time of 100% luminance, a maximum luminance level of the HDR image to be transmitted, a bit value of the image data indicating 0% luminance, a bit value of the image data indicating 100% luminance, and a bit value of the image data indicating a maximum white level that is expressed in the HDR image, and the HDR image being considered can be displayed by performing image correction based on the approximated curve.

Figure 11:
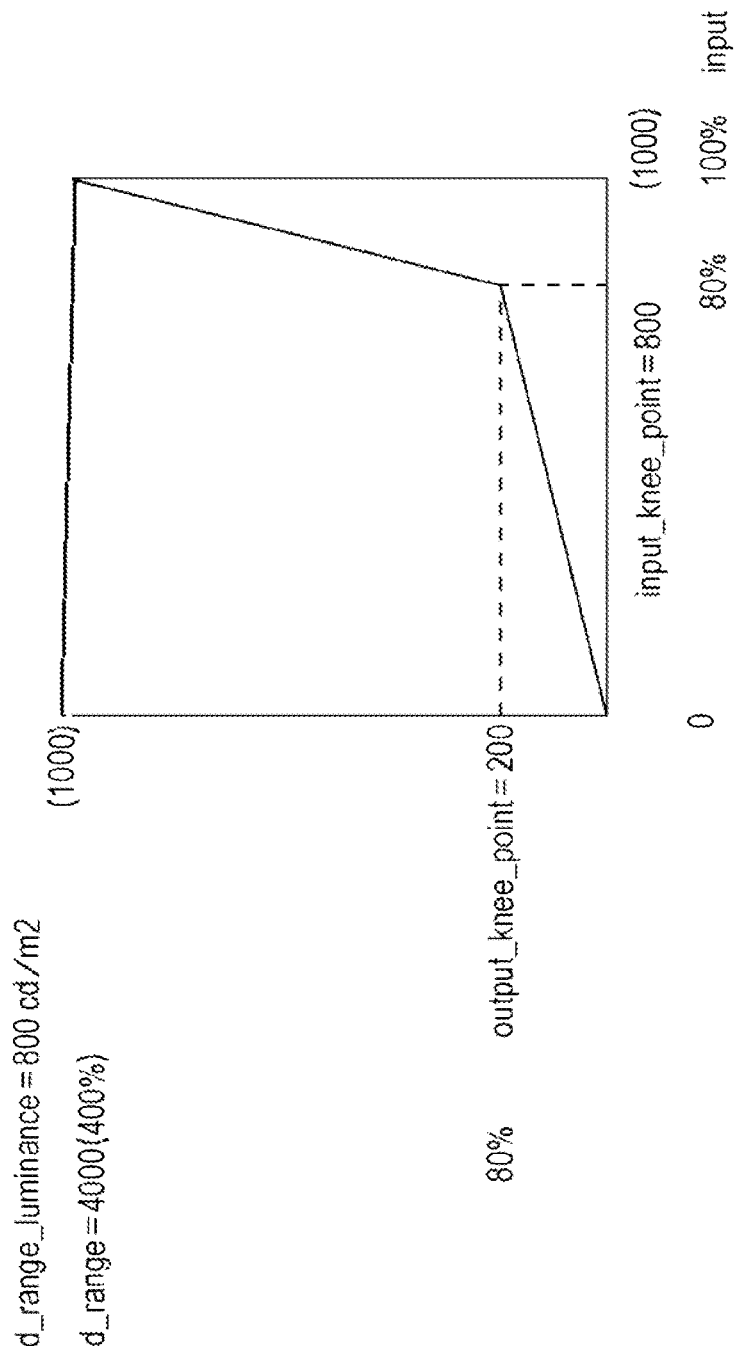
FIG. 11 is a diagram for describing HDR information (2) that is transmitted with the Vendor Specific InfoFrame packet.

In the gamma correction method (2), as illustrated in FIG. 11, the gamma correction curve can be approximated by assigning an output luminance level of the display panel 211 that is assumed at the time of an assigned luminance input level, a luminance dynamic-range value of the HDR image being transmitted, and a maximum luminance level, and the HDR image being assumed can be displayed by performing the image correction based on the approximated curve.

In the gamma correction method (3), as illustrated in FIG. 12, the gamma correction curve can be approximated by assigning a luminance level at the time of the 100% luminance that is defined in ITU-R BT.1886, a luminance level at the time of 0% luminance, a gamma value, and the HDR image being assumed can be displayed by performing the image correction based on the approximated curve.

[Example of a Data Structure of the EDID]

Figure 13:
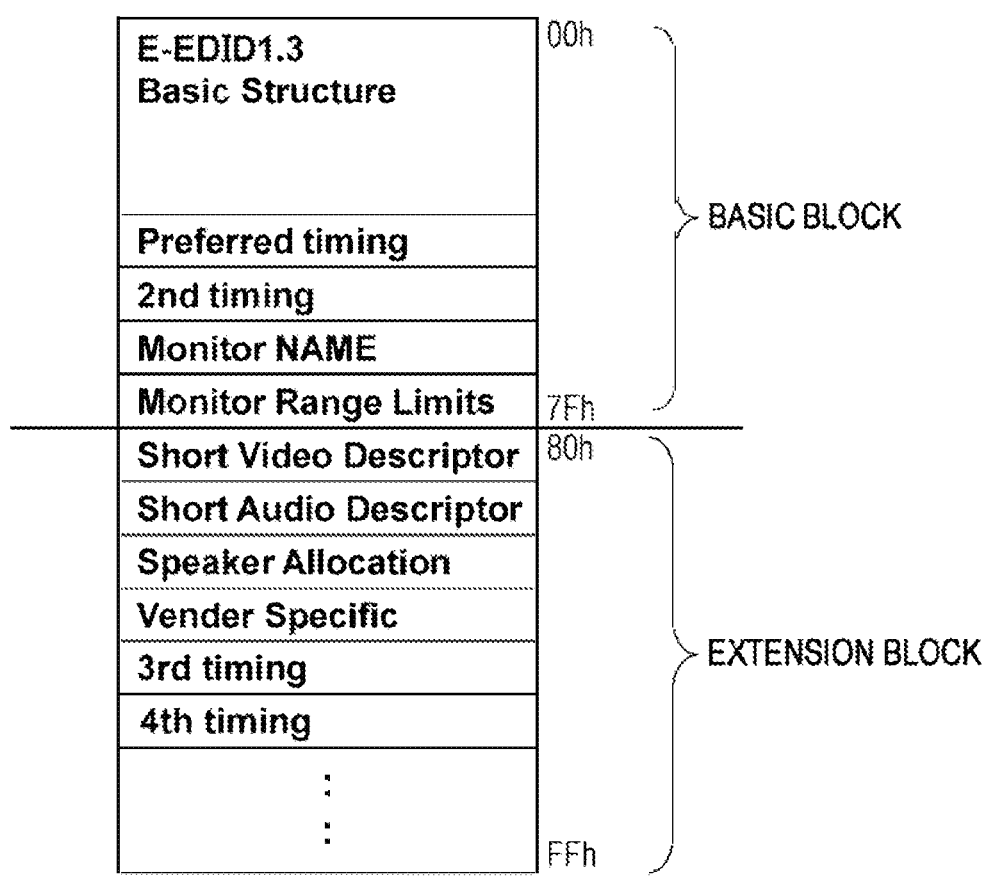
FIG. 13 is a diagram illustrating an example of a data structure of E-EDID that is stored in the synchronized apparatus (television receiver).

FIG. 13 illustrates an example of a data structure of the E-EDID. The E-EDID is made from a basic block and an extension block. Data that is prescribed with E-EDID 1.3 specifications that are expressed as "E-EDID 1.3 Basic Structure" is arranged in a head of the basic block. Subsequently, timing information for maintaining compatibility with the previous EDID, which is expressed as "Preferred timing", and timing information different from "Preferring timing" for maintaining the compatibility with the previous EDID, which is expressed as "2nd timing", are arranged.

Furthermore, in the basic block, subsequently to "2nd timing", information indicating a name of the display apparatus that is expressed as "Monitor Name", and information indicating the number of pixels that are available for display in the case of an aspect ratio of 4 to 3 or 16 to 9, which is expressed as "Monitor Range Limits" are sequentially arranged.

In a head of the extension block, an image size (resolution) that is available for display, a frame rate, information indicating whether the display is interlaced or progressive, data containing a description of information such as an aspect ratio, which are expressed as "Short Video Descriptor", and a method of coding and decoding voice reproducible, a sampling frequency, a cut-off band, and data containing a description of information such as the number of codec bits, which are expressed as "Short Audio Descriptor", and information relating to left and right speakers, which is expressed as "Speaker Allocation" are sequentially arranged.

Furthermore, in the extension block, subsequently to "Speaker Allocation", data that is specifically defined for every maker, which is expressed as "Vender Specific", timing information for maintaining compatibility with the previous EDID, which is expressed as "3rd timing", and timing information for maintaining compatibility with the previous EDID, which is expressed as "4th timing", are arranged.

[Example of the Data Structure of a Vendor Specific Data Block (VSDB) Region]

According to the embodiment, the data area that is extended to store the HDR image information is defined in the VSDB region. FIG. 14 illustrates an example of a data structure of a VSDB region. 0-th to N-th blocks, each of which is one byte block, are provided in the VSDB region.

A Data region of the HDR image information that the synchronized apparatus (the television receiver 12 according to the embodiment) has to store is defined in a fourth bit of an eighth byte and in (M+1)-th to (M+3)-th bytes subsequent to already-defined 0-th to M-th bytes.

First, 0-th to 8-th bytes are described. A header indicating a data region that is expressed as "Vender-specific tag code (=3)", and information indicating a length of the VSDB data that is expressed as "Length (=N)" are arranged in the 0-th byte arranged in the head of the data, which is expressed as "Vendor Specific". Furthermore, information indicating a number "0x000C03" that is registered for HDMI®, which is expressed as "24 bit IEEE Registration Identifier (0x000C03) LSB first" is arranged in first to third bytes.

Additionally, information indicating a 24-bit physical address of the synchronized apparatus, which is expressed by each of "A", "B", "C" and "D" is arranged in fourth to fifth bytes. A flag indicating a function that the synchronized apparatus supports, which is expressed as "Supports-AI", each piece of information assigning the number of bits per one pixel, which is expressed as each of "DC-48 bit", "DC-36 bit", and "DC-30 bit", a flag indicating whether the synchronized apparatus supports the transmission of a 4:4:4:YCbCr image, which is expressed as "DCY 444", and a flag indicating whether the synchronized apparatus supports a Digital Visual interface (DVI), which is expressed as "DVI-Dual", are arranged in a sixth byte.

Furthermore, information indicating a maximum frequency of a pixel clock of the TMDS, which is expressed as "Max-TMDS-Clock" is arranged in a seventh byte. Flags of information assigning the presence of a latency field, information assigning the presence of an interlace latency field, information assigning the presence of extension of a 3D video format, and information assigning support of a function of a content type (CNC) are arranged in an eighth byte. In a fourth bit of the eighth byte, a flag indicating whether or not HDR information that the synchronized apparatus supports is present is newly arranged. If the flag is True, this indicates that information relating to HDR is present in in (15+M)-th to (18+M)-th bytes.

Next, the (15+M) to (18+M)-th bytes are described. Whether or not processing relating to an HDR function is prohibited in the source apparatus is indicated in a seventh bit of the (15+M)-th byte. Data indicating the three video formats (the transmission methods (1) to (3) described above) of the HDR image that the synchronized apparatus supports is written in each of sixth to fourth bits of the (15+M)-th byte.

If methods other than this are proposed, third to 0-th bits of the (15+M)-th byte are available for assignment. Data indicating the three methods of the gamma correction for the HDR image that the synchronized apparatus supports is written in each of seventh to fifth bits of the (16+M)-th byte. If gamma correction methods other this are proposed, fourth to 0-th bits of the (16+M)-th byte are available for assignment.

As an example, if a seventh bit is True, processing, such as increasing a luminance level of the HDR image or compressing bits, is prohibited in the source apparatus. A maximum luminance value that is available with the display panel unit 211 of the synchronized apparatus is assigned in a unit of cd/m² to a (17+M)-th byte. A level of the maximum luminance increase that is possible with the processing by the picture signal processing circuit 208 of the synchronized apparatus is assigned denominated as a unit of percentage to the (18+M)-th byte. If "Raw" in a seventh bit of the (15+M)-th byte is False, these are used as pieces of information on the synchronized apparatus, necessary for the processing, such as the increase in the luminance of the HDR image or the bit compression, that is performed in the source apparatus.

A method of storing HDR transmission information using a VSDB region is proposed here, but the storing of the HDR transmission information is not limited to this method, because the storing is realizable, also in data regions other than this, with the data structure of the E-EDID, for example, such as with a Video Capability Data Block (VCDB).

In the AV system 10 illustrated in FIG. 1, the CPU 104 of the disk player (source apparatus) 11 checks connection to the television receiver (synchronized apparatus) 12 with the HPD line (refer to FIG. 2). Thereafter, using the DDC 23 (refer to FIG. 2), the CPU 104 of the disk player 11 reads the E-EDID and therefore the HDR image information from the television receiver 12 and recognizes a transmission method for a HDR image that the television receiver 12 supports.

In the AV system 10 illustrated in FIG. 1, when the HDR image data is transmitted to the television receiver 12, the disk player 11, as described above, selects any transmission method and any gamma correction method from among the transmission methods and the gamma correction methods for the HDR image data that the television receiver 12 can support, respectively, based on the HDR image information that is read from the television receiver 12, and thus selects the transmission method and the gamma correction method and transmits the HDR image data. At that time, the disk player 11 transmits information relating to the HDR image format that is currently transmitted, to the television receiver 12.

In this case, the disk player 11 transmits the information to the television receiver 12 by inserting the information during the blanking period of the HDR image data (picture signal) that is transmitted to the television receiver 12. At this point, the disk player 11, for example, inserts the information relating to the image format that is currently transmitted, into the blanking period of the HDR image data by using a Vendor Specific InfoFrame (hereinafter referred to as "VSIF") packet of HDMI and the like. The VSIF packet is arranged in the data island period 19 (refer to FIG. 3) described above.

[Example of the Data Structure of the VSIF Packet]

FIG. 15 illustrates an example of the data structure of the VSIF packet. With HDMI, supplementary information relating to the image can be transmitted from the source apparatus to the synchronized apparatus using the VSIF packet. A checksum of the data is defined in a 0-th byte. Information indicating a number "0x000C03" that is registered for HDMI®, which is expressed as "24 bit IEEE Registration Identifier (0x000C03) LSB first" is arranged in first to third bytes.

A flag indicating whether or not 3D data is present in fifth to (7+N)-th bytes subsequent to a fourth byte is assigned to a seventh bit of a fourth byte. A "HDR Format" flag indicating whether or not transmission information on the HDR image data is present in (8+N)-th and later bytes is assigned to a succeeding sixth bit. If the "HDR Format" flag is False, this indicates that there is no transmission of the HDR image data. If the "HDR Format" flag is True, supplementary information relating to the HDR image is assigned to (8+N)-th to (11+M+N)-th bytes.

Information on whether or not the processing, such as the luminance increase or the luminance compression, is performed on the HDR image to be transmitted in the source apparatus is assigned to a seventh bit of a (8+N)-th byte. If "Raw" is true, this indicates that the processing, such as the luminance increase, is not performed on the source apparatus. If the "Raw" is False, this indicates that the processing, such as the luminance increase, is performed on the source apparatus.

Information on which one of the three methods (transmission methods (1) to (3)) (picture formats) of transmitting the HDR image is selected is assigned to succeeding sixth to fourth bits. In this case, for the sixth to fourth bits, the transmission method (1) is set to 0b001, the transmission method (2) to 0b010, and the transmission method (3) to 0b011. If methods other than this are proposed, 0b100 to 0b111 of the sixth to fourth bits, and third to 0-th bits are available for assignment.

Information on which one of three gamma correction methods (gamma correction methods (1) to (3) described above) for the HDR image is selected is assigned to seventh to fourth bits of a (9+N)-th byte. In this case, for the seventh to fourth bits, the gamma correction method (1) is set to 0b0001, the gamma correction method (2) to 0b0010, and the gamma correction method (3) to 0b0011. If methods other than this are proposed, 0b0100 to 0b1111 of the seventh to fifth bits, and fourth to 0-th bits are available for assignment. A byte length (M) of the data in the gamma correction method, which is assigned to (11+N)-th and later bytes, is assigned to a (10+N)-th byte.

FIG. 16 illustrates a gamma correction data structure for the gamma correction method (1) (refer to FIG. 10). A data length 9 for the gamma correction method (1) is assigned to a (10+N)-th byte. The luminance level of the display panel 211 that is assumed at the time of the 100% luminance, "Reference_Screen_Luminance_White" is assigned in a unit of $cd/m^2$ to (11+N)-th to (12+N)-th bytes. The maximum luminance level of the HDR image to be transmitted, "Extended_Range_White_Level" is assigned denominated as a unit of a percentage to (13+N)-th to (14+N)-th bytes.

A bit value of the image data indicating a 0% luminance level, "Nominal_Black_Level_Code_Value" is assigned to (15+N)-th byte. Normally, because values from 0 to 64 are assigned, the length is one byte. A bit value of the image data indicating the 100% luminance level, "Nominal_White_Level_Code_Value", is assigned to (16+N)-th to (17+N)-th bytes. A bit value of the image data indicating the maximum white level that is expressed in the HDR image, "Extended_White_Level_Code_Value" is assigned to (18+N)-th to (19+N)-th bytes.

FIG. 10 described above illustrates one example of the HDR information (1) that is transmitted with the VSIF packet, that is, the values of the "Extended_Range_White_Level", the "Nominal_Black_Level_Code_Value", "Nominal_White_Level_Code_Value", and the "Extended_White_Level_Code_Value" that are described above. In this example, "Extended_Range_White_Level" is "400", and the bit length is 10 bits.

FIG. 17 illustrates a gamma correction data structure for the gamma correction method (2). A data length 13 for the gamma method (2) is assigned to the (10+N)-th byte. An input luminance level for the method (2), "Input_Knee_Point", is assigned in units of 0.1% to (11+N)-th to (12+N)-th bytes. An output luminance level, "Output_Knee_Point", is assigned in units of 0.1% to (13+N)-th to (14+N)-th bytes.

A dynamic range of the HDR image to be transmitted, "Dynamic_Range", is assigned in units of 0.1% to (15+N)-th to (18+N)-th bytes. A luminance level in the maximum dynamic range, "Dynamic_Range_Luminance" is assigned in a unit of $cd/m^2$ to (19+N)-th to (22+N)-th bytes.

FIG. 11 described above illustrates one example of the HDR information (2) that is transmitted with the VSIF packet, that is, the values of the "Input_Knee_Point", the "Output_Knee_Point", "Dynamic_Range", and the "Dynamic_Range_Luminance" that are described above. The data structure for a set of "Knee_Point"s is illustrated here, but a more precise curve can be approximated using data with the multiple "Knee_Point's".

FIG. 18 illustrates a gamma correction data structure for the gamma method (3). A data length 4 for the gamma correction method (3) is assigned to the (10+N)-th byte. The luminance level at the time of the 100% luminance, "Screen_Luminance_White_Level" is assigned in a unit of $cd/m^2$ to (11+N)-th to (12+N)-th bytes. The luminance level at the time of the 0% luminance, "Screen_Luminance_Black_Level" is assigned in a unit of $cd/m^2$ to a (13+N)-th byte. Normally, because values from 0 to 64 are assigned, the length is one byte. A gamma value, "Gamat_Value" is assigned to a (14+N)-th byte.

FIG. 12 described above illustrates one example of a calculation formula using the HDR information (3) that is transmitted with the VSIF packet, that is, the "Screen_Luminance_White_Level", the "Screen_Luminance_Black_Level", and the "Gamat_Value" that are described above.

If any one of sixth to fourth bits of a (8+N)-th byte is set to True, the synchronized apparatus (the television receiver 12 according to the embodiment) can determine that the HDR image data is transmitted. Additionally, the synchronized apparatus can determine the transmission method (picture format), depending to which one of the sixth to fourth bits is set to True.

That is, if the sixth to fourth bits are set to 0b001, it is understood that the picture format called 1,920×1,080p deep color is used, and thus the transmission of the HDR image data is performed (refer to FIG. 7). Furthermore, if the sixth to fourth bits are set to 0b010, the stereoscopic picture format called 1,920×1,080p frame packing is used, and thus the transmission of the HDR image data is performed (refer to FIG. 8). Furthermore, it is understood that if the sixth to fourth bits are set to 0b011, the 1,920×1,080p picture format for the high frame rate is used, and thus the transmission of the HDR image data is performed (refer to FIG. 9).

Furthermore, with values of seventh to fourth bits of (9+N)-th byte, the gamma correction method for the HDR image can be determined. That is, it is understood that if seventh to fourth bits are set to 0b0001, the gamma correction method (1) is used, and thus the transmission of the HDR image data is performed (refer to FIG. 10).

Furthermore, it is understood that if the seventh to fourth bits are set to 0b0010, the gamma correction method (2) is used, and thus the transmission of the HDR image data is performed (refer to FIG. 11). Furthermore, it is understood that if the seventh to fourth bits are set to 0b0011, the gamma correction method (3) is used, and thus the transmission of the HDR image data is performed (refer to FIG. 12).

A method of transmitting the HDR transmission information using the VSIF packet is proposed here, but the transmitting of the HDR transmission information is not limited to this method, because the transmission is realizable also with data packets other than this, for example, such as with an Auxiliary Video (AV) InfoFrame. However, if the information relating to HDR of the television receiver (synchronized apparatus) 12 is transmitted to the disk player (source apparatus) 11 using the VSDB region of an E-EDID data region, it is desirable that the information relating to HDR of the disk player 11 be transmitted with the VSIF packet.

[Example of Processing by the Source Apparatus at the time of Connection to an Apparatus]

Figure 19:
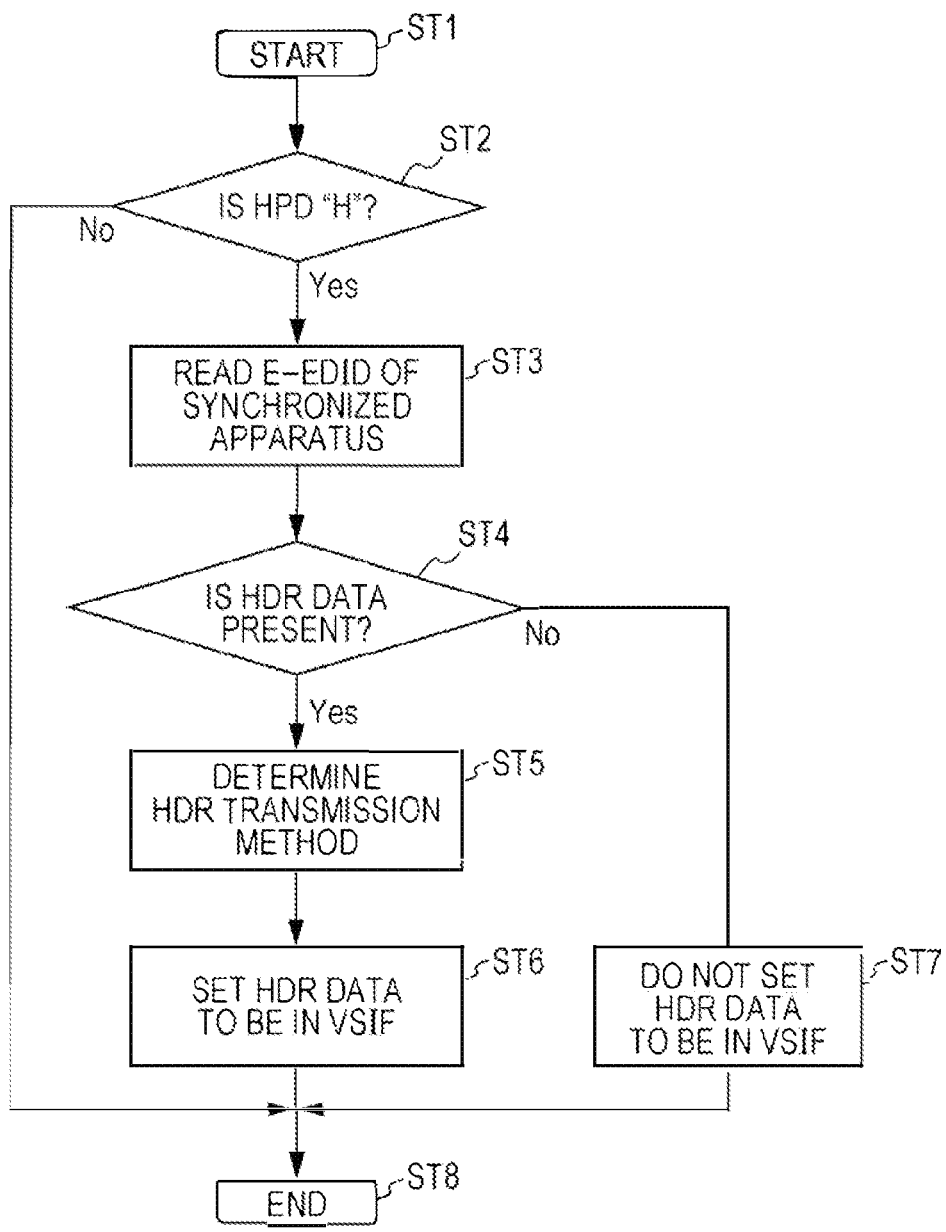
FIG. 19 is a flow chart illustrating an example of processing by the source apparatus (disk player) at the time of connection to an apparatus.

Next, processing by the disk player (source apparatus) 11 at the time of connection to the television receiver (synchronized apparatus) 12 in the AV system 10 illustrated in FIG. 1 is described referring to a flow chart in FIG. 19.

The disk player 11 starts processing in Step ST1, and thereafter proceeds to processing in Step ST2. In Step ST2, the disk player 11 determines whether or not a HPD signal is at a high level "H". When the HPD signal is not at the high level "H", the television receiver (synchronized apparatus) 12 is not connected to the disk player 11. At this time, the disk player 11 proceeds to Step ST8, and the processing ends.

If the HPD signal is at the high level "H", the disk player 11 reads the E-EDID of the television receiver 12 in Step ST3. Then, in Step ST4, the disk player 11 determines whether or not the HDR image information (HRD data) is present. When the HDR image information is not present, the disk player 11 sets data indicating non-transmission of the HDR image to be in the VSIF packet in Step ST7 and thereafter proceeds to Step ST8, and the processing ends. At this point, the setting of the data indicating the non-transmission of the HDR image means that a sixth bit of a fourth byte in the VSIF packet (refer to FIG. 15) is set to a low level "L".

Furthermore, when the HDR image information is present in Step ST4, the disk player 11 determines the transmission method for and the gamma correction method for the HDR image data in Step ST5. Then, the disk player 11 sets data indicating the transmission method for and the gamma correction method for the HDR image data to be in the VSIF packet in Step ST6, and thereafter proceeds to Step ST8, and the processing ends.

[Example of Selection Processing of the HDR Transmission Method in the Source Apparatus]

Figure 20:
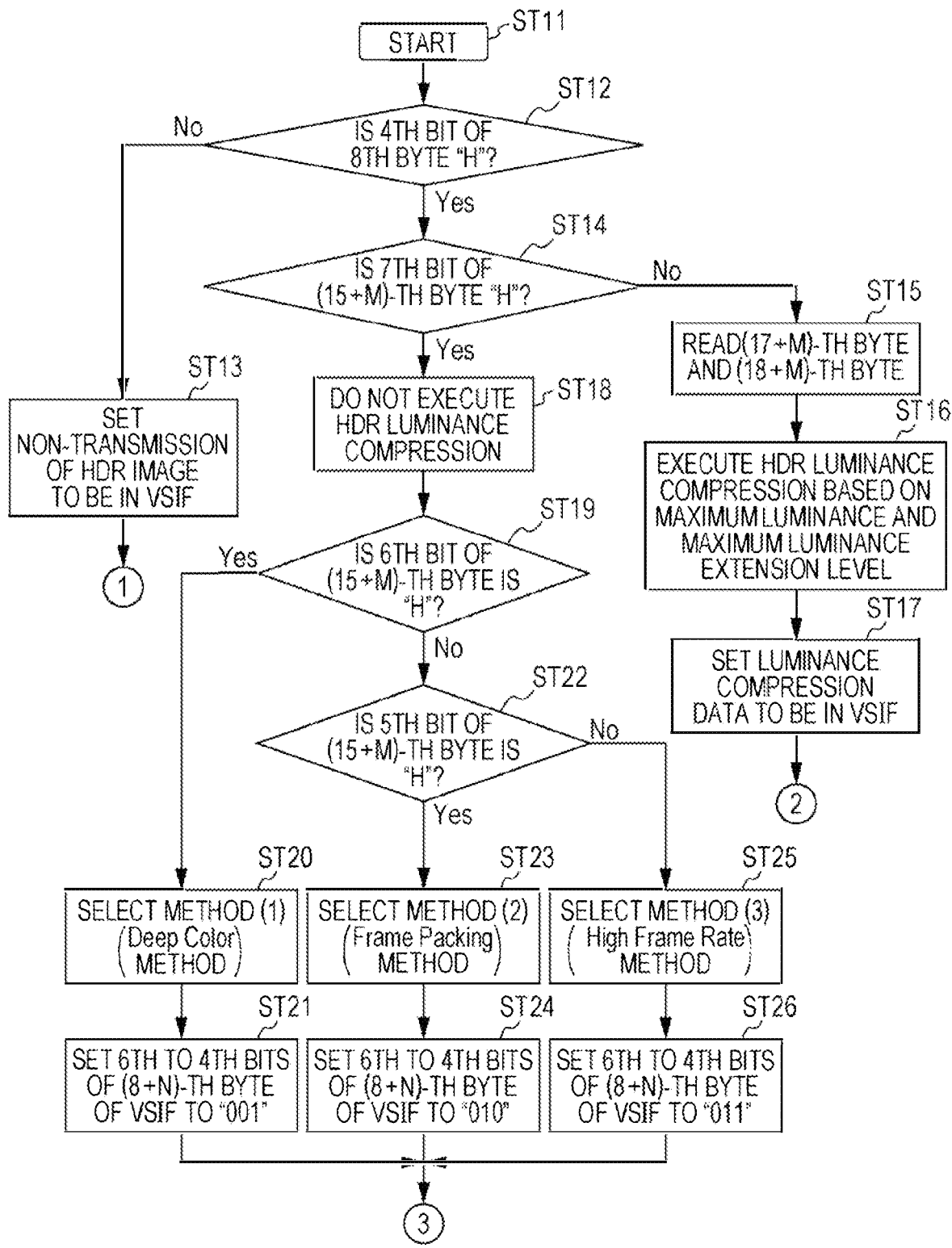
FIG. 20 is a flow chart illustrating an example of processing that selects the HDR transmission method with the source apparatus (disk player).
Figure 21:
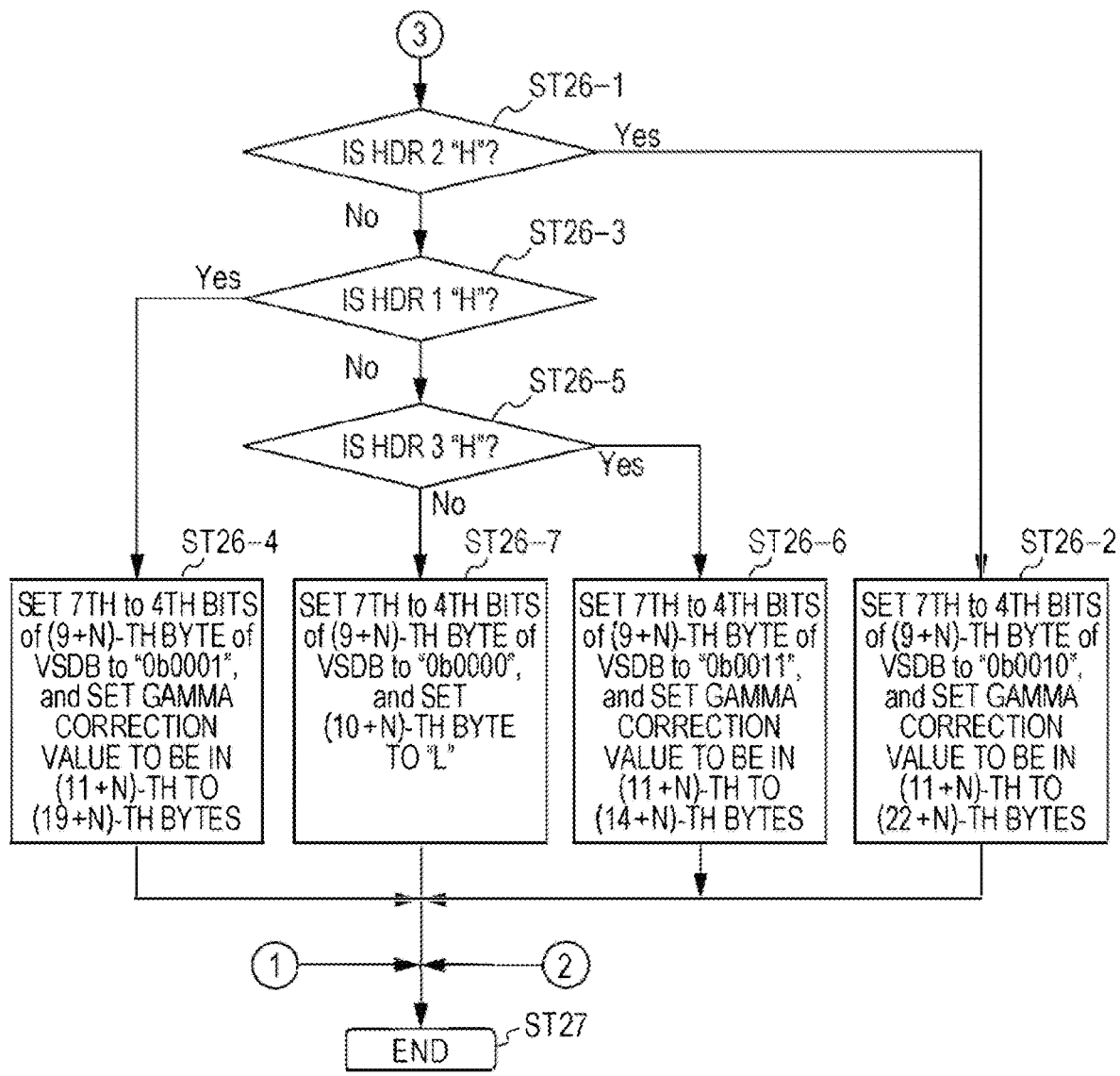
FIG. 21 is a flow chart (continued) illustrating an example of the processing that selects the HDR transmission method with the source apparatus (disk player).

Next, determination processing (processing in Step ST5 in FIG. 19) by the disk player (source apparatus) 11 of the transmission method for the HDR image data in the AV system 10 illustrated in FIG. 1 is described referring to flow charts in FIGS. 20 and 21.

The disk player 11 starts processing in Step ST11, and thereafter proceeds to Step ST12. In Step ST12, the disk player 11 determines whether or not a fourth bit of an eighth byte in the VSDB region in the television receiver (synchronized apparatus) 12 is at the high level "H". When the fourth bit of the eighth byte is not at the high level "H", the disk player 11 sets the data indicating the non-transmission of the HDR image to be in the VSIF packet in Step ST13 and thereafter proceeds to Step ST27, and the processing ends. At this point, the setting of the data indicating the non-transmission of the HDR image means that the sixth bit of the fourth byte in the VSIF packet (refer to FIG. 12) is set to "L".

When in Step ST12, the fourth bit of the eighth byte is at the high level "H", the disk player 11 proceeds to processing in Step ST14. In Step ST14, the disk player 11 determines whether or not a seventh bit of a (15+M)-th byte in the VSDB region in the television receiver 12 is at the high level "H". When the seventh bit of the (15+M)-th byte is not at the high level "H", the disk player 11 reads a (17+M)-th byte and a (18+M)-th byte in the VSDB region in Step ST15 and proceeds to the next Step ST16.

In Step ST16, the disk player 11 performs luminance compression processing of the HDR image to be transmitted, based on the data on the maximum luminance ($cd/m^2$) of the display panel 211, stored in the (17+M)-th byte that is read, and on the data on the maximum luminance increase level (%) stored in the (18+M)-th byte, and proceeds to the next Step ST17. In Step ST17, the disk player 11 sets data indicating the performing of the luminance compression processing on the HDR image and the information on the gamma correction to be in the VSIF packet and thereafter proceeds to Step ST27, and the processing ends. At this point, the setting of the data indicating the performing of the luminance compression on the HDR image means that a seventh bit of a (8+N)-th byte in the VSIF packet (refer to FIG. 15) is set to "False='L'".

Furthermore, when in Step ST14, the seventh bit of the (15+M)-th byte is at the high level "H", the disk player 11 proceeds to the next Step 19 without performing the luminance compression processing on the HDR image in Step ST18. In Step ST19, the disk player 11 determines whether or not a sixth bit of the (15+M)-th byte in the VSDB region is set to the high level "H".

When the sixth bit of the (15+M)-th byte is at the high level "H", the disk player 11 selects the method (1) from among the HDR image transmission methods in Step ST20, and proceeds to the next Step ST21. The disk player 11 sets data indicating the transmission method (1) for the HDR image to be in the VSIF packet in Step ST21, and thereafter proceeds to Step ST26-1. At this point, the setting of the data indicating the transmission method (1) for the HDR image means that sixth to fourth bits of a (8+N)-th byte in the VSIF packet (refer to FIG. 15) are set to "0b001".

Furthermore, when in Step ST19, the sixth bit of the (15+M)-th byte is at the low level "L", proceeding to the next Step ST22 takes place. In Step ST22, the disk player 11 determines whether or not a fifth bit of the (15+M)-th byte in the VSDB region is set to the high level "H". When the fifth bit of the (15+M)-th byte is at the high level "H", the disk player 11 selects the method (2) from among the HDR image transmission methods in Step ST23, and proceeds to the next Step ST24.

In Step ST24, the disk player 11 sets data indicating the transmission method (2) for the HDR image to be in the VSIF packet, and thereafter proceeds to Step ST26-1. At this point, the setting of the data indicating the transmission method (2) for the HDR image means that the sixth to fourth bits of the (8+N)-th byte in the VSIF packet (refer to FIG. 15) are set to "0b010".

Furthermore, when the fifth bit of the (15+M)-th byte is not at the high level "H" in Step ST22, the disk player 11 selects the method (3) from among the HDR image transmission methods in Step ST25, and proceeds to the next Step 26. In Step ST26, the disk player 11 sets data indicating the transmission method (3) for the HDR image to be in the VSIF packet, and thereafter proceeds to Step ST26-1. At this point, the setting of the data indicating the transmission method (3) for the HDR image means that the sixth to fourth bits of the (8+N)-th byte in the VSIF packet (refer to FIG. 15) are set to "0b011".

In Step ST26-1, the disk player 11 determines whether or not a sixth bit of a (16+M)-th byte in a VSDB packet is at the high level "H". When the sixth bit of the (16+M)-th byte is at the high level "H", in Step ST26-2, the disk player 11 sets seventh to fourth bits of a (9+N)-th byte in the VSIF region to "0b0010", sets data on the gamma correction method (2) to be in (10+N)-th to (22+N)-th bytes, and proceeds to Step ST27, and the processing ends.

Furthermore, when in Step ST26-1, the sixth bit of the (16+M)-th byte in the VSDB packet is not at the high level "H", the disk player 11 proceeds to Step ST26-3. In Step ST26-3, the disk player 11 determines whether or not a seventh bit of the (16+M)-th byte in the VSDB packet is at the high level "H". When the seventh bit of the (16+M)-th byte is at the high level "H", in Step ST 26-4, the disk player 11 sets the seventh to fourth bits of the (9+N)-th byte in the VSIF region to "0b0001", sets data on the gamma correction method (1) to be in (10+N)-th to (19+N)-th bytes, and proceeds to Step ST27, and the processing ends.

Furthermore, when in Step ST26-3, the seventh bit of the (16+M)-th byte is not at the high level "H", the disk player 11 proceeds to Step ST26-5. In Step ST26-5, the disk player 11 determines whether or not a fifth bit of the (16+M)-th byte in the VSDB packet is at the high level "H". When the fifth bit of the (16+M)-th byte is at the high level "H", in Step ST 26-6, the disk player 11 sets the seventh to fourth bits of the (9+N)-th byte in the VSIF region to "0b0011", sets data on the gamma correction method (3) to be in (10+N)-th to (14+N)-th bytes, and proceeds to Step ST27, and the processing ends.

Furthermore, when in Step ST26-5, the fifth bit of the (16+M)-th byte in the VSDB packet is not at the high level "H", the disk player 11 proceeds to Step ST26-7. In Step ST 26-7, seventh to fourth bits of a (9+N)-th byte in the VSIF region are set to "0b0000", and a (10+N)-th byte is set to "L", proceeding to Step ST27 takes place, and the processing ends.

[Example of Processing by the Synchronized apparatus at the Time of Setting an Energy Saving Mode]

Figure 22:
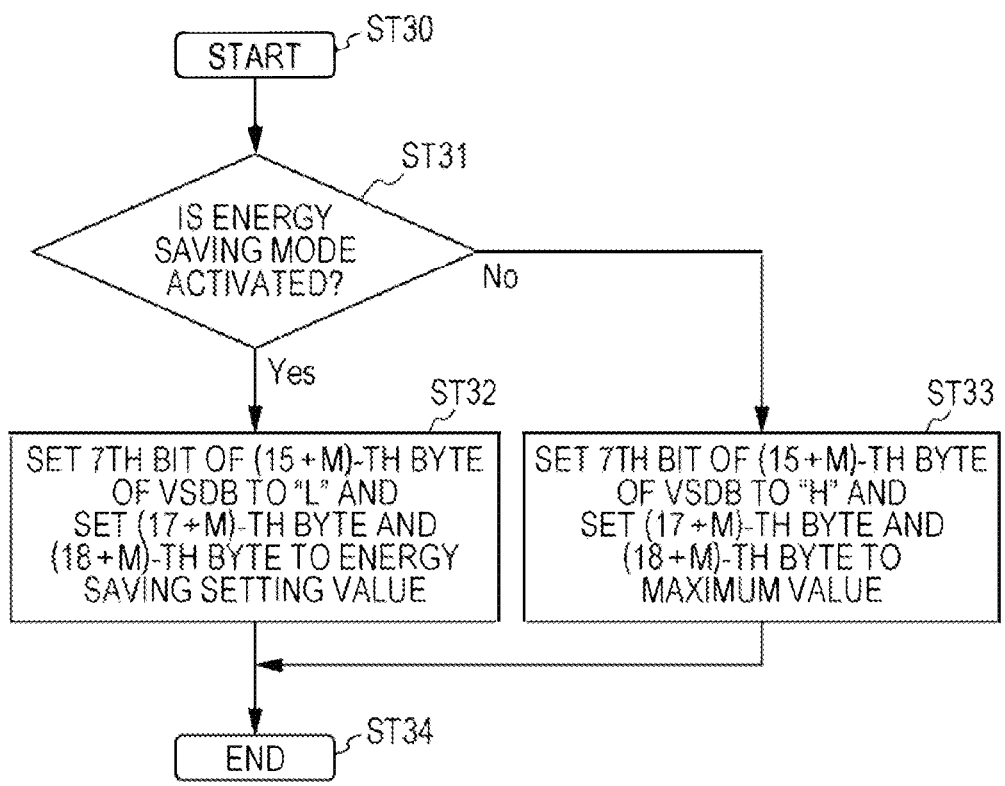
FIG. 22 is a flow chart illustrating an example of processing that is performed when an energy saving mode is set in the synchronized apparatus (television receiver).

Next, processing by the television receiver (synchronized apparatus) 12 at the time of setting an energy saving mode in the AV system 10 illustrated in FIG. 1 is described referring to a flow chart in FIG. 22. The television receiver 12 starts processing in Step ST30, and thereafter proceeds to Step ST31. In Step ST31, the television receiver 12 determines whether or not its own operation mode is set to an energy saving mode.

When the setting to the energy saving mode is performed, from the perspective of the energy saving, it is not desirable that the television receiver 12 perform the HDR luminance increase more than is necessary, because the user selects an operation that suppresses power consumption by decreasing the luminance of the display panel 211 and thus displaying an image. For this reason, when the setting to the energy saving mode is performed, the television receiver 12 proceeds to processing in Step ST32.

In Step ST32, the television receiver 12 sets a seventh bit of a (15+M)-th byte that is present in the VSDB region of its own E-EDID to "False='L'". Furthermore, in Step ST32, the television receiver 12 further sets values of the maximum luminance level of the display panel 211, stored in a (17+M)-th byte, and of a maximum luminance range, stored in a (18+M)-th byte, to values of the luminance level and a maximum luminance range that are set in the energy saving mode, respectively. Thereafter, the television receiver 12 proceeds to Step ST34, and the processing ends.

Furthermore, when the setting to the energy saving mode is not performed in Step ST31, the television receiver 12 proceeds to Step ST33. In Step ST33, the television receiver 12 sets the seventh bit of the (15+M)-th byte that is present in the VSDB region of its own E-EDID to "True='H'". Furthermore, in Step ST33, the television receiver 12 further sets the values of the maximum luminance level of the display panel 211, stored in the (17+M)-th byte, and of the maximum luminance range, stored in the (18+M)-th byte, to values of its own maximum luminance level and maximum luminance range, respectively. Thereafter, the television receiver 12 proceeds to Step ST34, and the processing ends.

[Example in which Processing by the Synchronized Apparatus Cancels the Energy Saving Mode]

Figure 23:
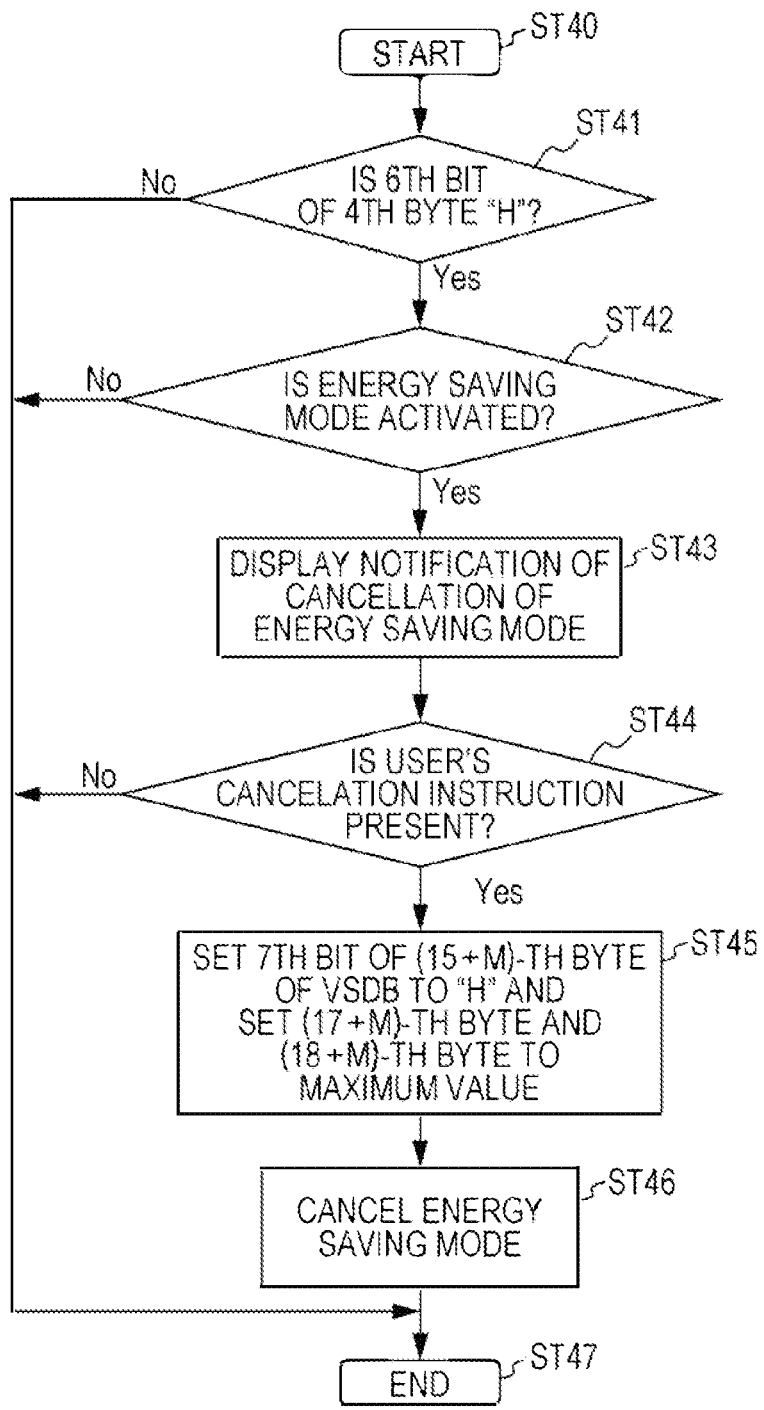
FIG. 23 is a flow chart illustrating an example of processing that cancels the energy saving mode in the synchronized apparatus (television receiver).

Next, processing that the television receiver (synchronized apparatus) 12 performs when the HDR image begins to be transmitted from the disk player (source apparatus) 11 at the time of setting the energy saving mode in the AV system 10 illustrated in FIG. 1 is described referring to a flow chart in FIG. 23.

The television receiver 12 starts processing in Step ST40, and thereafter proceeds to Step ST41. In Step ST41, the television receiver 12 determines whether or not a sixth bit of a fourth byte in the VSIF packet (refer to FIG. 15) that is transmitted from the disk player 11 is set to the high level "H". If the sixth bit of the fourth byte is not set to the high level "H", it is determined that there is no transmission of the HDR image, proceeding to Step ST47 then takes place without canceling the energy saving mode and the processing ends.

If the sixth bit of the fourth byte is set to the high level "H" in Step ST41, the television receiver 12 proceeds to Step ST42. In Step ST42, the television receiver 12 determines whether or not the television receiver 12 itself is set to the energy saving mode. If the setting to the energy saving mode is not performed, the television receiver 12 determines that the reception of the HDR image is possible, then proceeds to Step ST47 without being set to the energy saving mode and the processing ends.

If the setting to the energy saving mode is performed in Step ST42, the television receiver 12 proceeds to the next Step ST43. In Step ST43, the television receiver 12 displays on the display panel 211 a selection screen through which the user gives an instruction as to whether or not to cancel the energy saving mode and thus perform reception of the HDR image, thus alerts the user to the selection screen, and when the user makes a selection, proceeds to the next Step ST44.

In Step ST44, the television receiver 12 determines whether or not the user gives an instruction to cancel the energy saving mode and thus select the performing of the reception of the HDR image. If the user does not desire to cancel the energy saving mode, the energy saving mode is not canceled, proceeding to Step ST47 then takes place and the processing ends.

If the user desires to cancel the energy saving mode in Step ST44, the television receiver 12 proceeds to the next Step ST45. In Step ST45, in order to cancel the energy saving mode and thus perform the reception of the HDR image, the television receiver 12 sets a seventh bit of a (15+M)-th byte in the VSDB region (refer to FIG. 14) to the high level "H", sets to a maximum value of the luminance level a luminance value at which a (17+M)-th byte and a (18+M)-th byte can be displayed on its own display panel 211, and proceeds to the next Step ST46. In Step ST46, the television receiver 12 cancels the energy saving mode, and thereafter proceeds to Step ST47, and the processing ends.

As described above, in the AV system 10 illustrated in FIG. 1, the HDR image data is transmitted from the disk player 11 to the television receiver 12 over the HDMI cable 13, the information on the transmission method for and the information on the gamma correction for the HDR image data are transmitted over the same HDMI cable 13, and thus the transmission of the HDR image data can be satisfactorily performed. For example, based on the information on the transmission method and the information on the gamma correction that are received, the television receiver 12 can appropriately process the received HDR image data.

Furthermore, in the AV system 10 illustrated in FIG. 1, the methods, as the transmission method for and the gamma correction method for the HDR image data, that the television receiver 12 can support, can be selected in the disk player 11. For this reason, in the television receiver 12, it can be ensured that the decoding processing and gamma correction processing are performed on the received HDR image data. In other words, the transmission of the HDR image data can be satisfactorily performed between the disk player 11 and the television receiver 12.

2. Modification Example

Moreover, according to the embodiment described above, the disk player 11 inserts the information on the transmission method for and the information on the gamma correction for the HDR image data during the blanking period of the image data (picture signal) using the VSIF packet, and thus these pieces of information are transmitted to the television receiver 12.

For example, the disk player 11 may transmit the information on the transmission method for and the information on the gamma correction for the HDR image data to the television receiver 12 over the CEC line 24 that is a control data line of the HDMI cable 13. Furthermore, for example, the disk player 11 may transmit the information on the transmission method for and the information on the gamma correction for the HDR image data to the television receiver 12 over the bidirectional communication path that is configured from the reserve line 27 and the HPD line 25 of the HDMI cable 13.

Furthermore, according to the embodiment described above, the pieces of information on the transmission method for and the gamma correction method for the HDR image data that the television receiver 12 supports are included in the E-EDID of the television receiver 12, and the disk player 11 reads the E-EDID over the DDC 23 of the HDMI cable 13 and thus obtains the pieces of information on the transmission method for and the gamma correction method for the HDR image data that the television receiver 12 supports.

However, the disk player 11 may receive the pieces of information on the transmission method for and the gamma correction method for the HDR image data that the television receiver 12 supports, from the television receiver 12 over the CEC line 24 that is the control data line of the HDMI cable 13, or over the bidirectional communication path that is configured from the reserve line 27 and the HPD line 25 of the HDMI cable 13.

Furthermore, according to the embodiment described above, the example is illustrated in which the disk player 11 transmits both of the information on the transmission method for and the information on the gamma correction for the HDR image data to the television receiver 12. However, a configuration is also considered in which either of these two pieces of information is transmitted.

Furthermore, according to the embodiment described above, it is illustrated that an HDMI transmission path is used. However, in addition to the HDMI, as baseband digital interfaces, there are a Mobile High-definition Link (MHL), a Digital Visual Interface (DVI) interface, a Display Port (DP) interface, a wireless interface using 60 GHz millimeter waves and the like. The present technology can be applied in the same manner to a case where the HDR image data is transmitted with these digital interfaces.

[Example of a Structure of a DP System]

Figure 24:
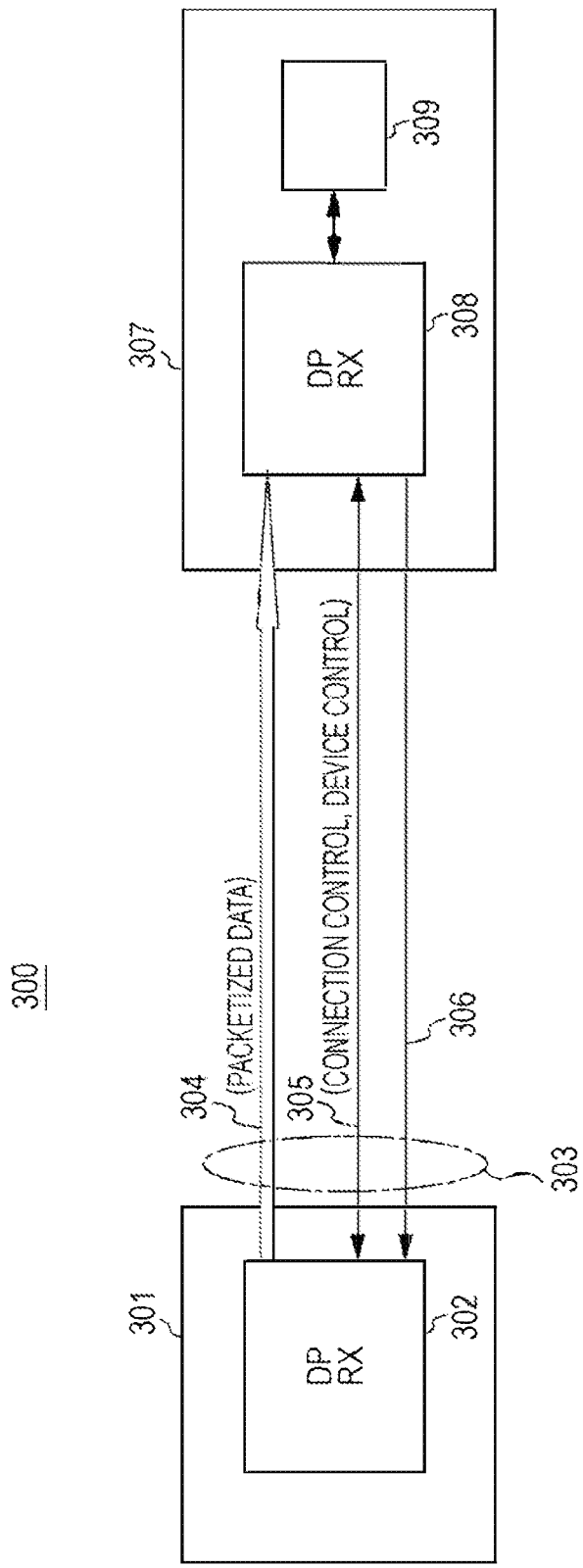
FIG. 24 is a block diagram illustrating a configuration example of a DP system that uses a DP interface.

FIG. 24 illustrates a configuration example of a DP system 300 that uses a DP interface. In the DP system 300, a DP transmitter 301 and a DP receiver 307 are connected to each other with a DP cable 303. In addition, the DP transmitter 301 includes a DP transmission unit 302, and the DP receiver 307 includes a DP reception unit 308 and a storage unit 309.

The DP cable 303 is configured from a main link 304, an AUX channel 305, and a hot plug detection 306. The main link 304 is configured from one, two, or four duplex terminal differential signal pairs (pair lines), does not have a dedicated clock signal, and a clock is instead embedded in an 8 B/10 B coded-data stream.

Unlike in the HDMI, in the DP interface, a transmission speed and a pixel frequency are independent of each other, and a pixel depth or resolution, a frame frequency, and the presence or absence of voice data or additional data such as DRM information within a transmission stream and an amount of the voice data or the additional data can be freely adjusted. The transmission of the HDR image data, the information on the transmission method for and the information on the gamma correction for the HDR image data is performed using the main link 304.

For a transmission data structure of the DP interface, the TMDS transmission data structure (refer to FIG. 3) in the HDMI is used, and for HDR image data, the image data structure in the HDMI in FIGS. 7 to 9 is used. Furthermore, the information on the transmission method for and the information on the gamma correction for the HDR image data use the packet of which the data structure is the same as that of the VSIF packet (refer to FIG. 15) that is inserted during the control period 19 (refer to FIG. 3) in the HDMI and thus is transmitted.

The DP transmitter 301 checks a connection to the DP receiver 307 with a hot plug detection 306. Thereafter, using the AUX channel 305, the DP transmitter 301 reads the HDR image information in the E-EDID from the storage unit 309 of the DP receiver 307 and recognizes the transmission method for the HDR image that the DP receiver 307 supports. The data structure of the HDR image information in E-EDID in the DP receiver 307 may be the same in FIGS. 13 and 14.

Furthermore, in addition to the main link 304, the DP interface has the half duplex bidirectional AUX channel 305 with a bandwidth of 1 Mbit/s or a bandwidth of 720 Mbit/s, and exchanging of information relating to a function between a transmitter and a receiver is performed by such bidirectional communication. The transmission of the information on the transmission method for and the information on the gamma correction method for the HDR image data can be performed using the AUX channel 305.

[Example of a Data Structure of the AUX Channel]

Figure 25:
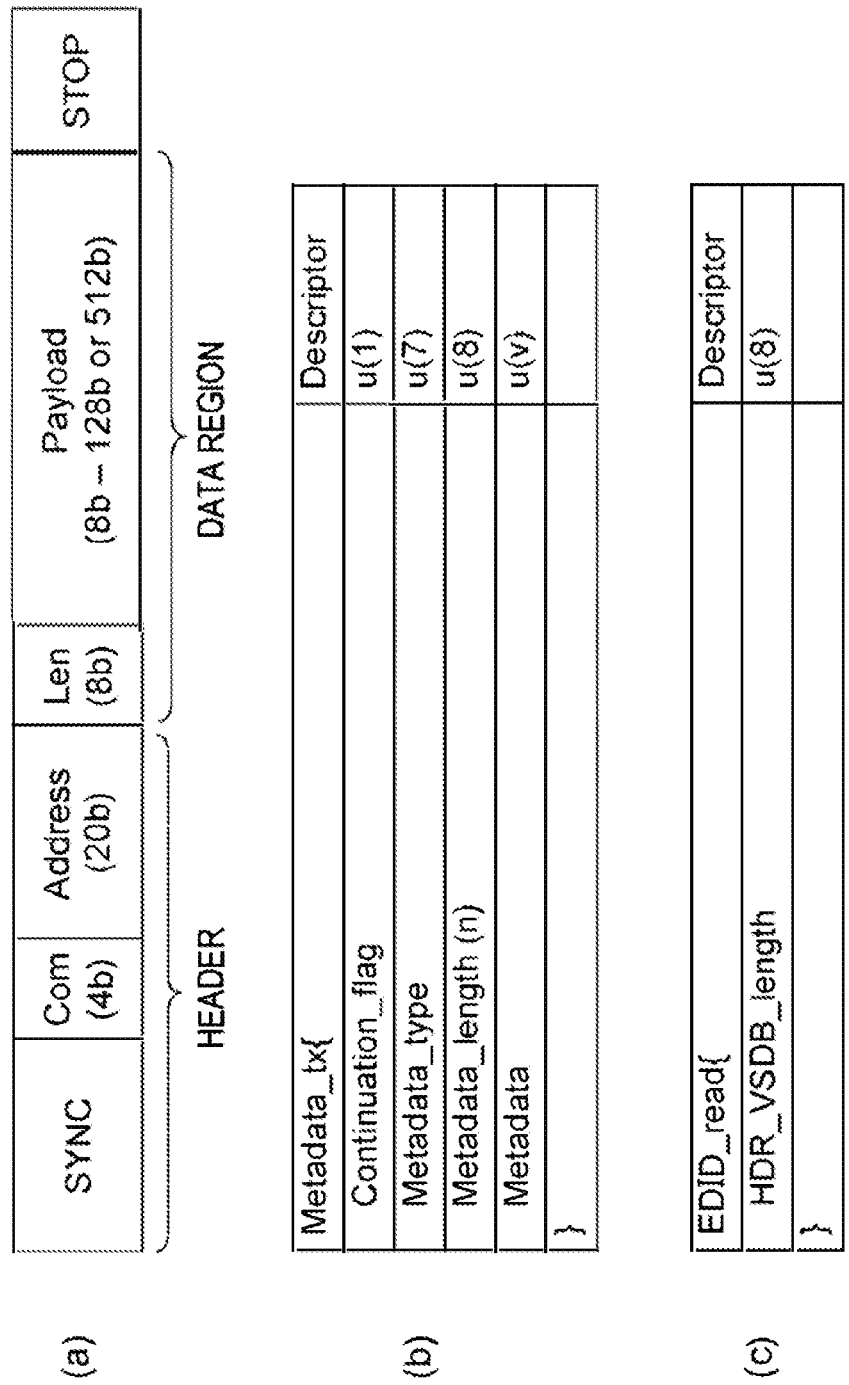
FIG. 25 a diagram illustrating an example of a packet structure and the like in a case where transmission of information on the transmission method for and information on the gamma correction method for the HDR image data is performed with an AUX channel.

FIG. 25(*a*) illustrates an example of a packet structure in a case where the transmission of the information on the transmission method for and the information on the gamma correction method for the HDR image data is performed with the AUX channel 305. A packet is configured from a header, a data region, and a STOP bit. The header is configured from a SYNC section for synchronization, a 4-bit command section, and a 20-bit memory address of the storage unit 309. Furthermore, the data region is configured from an 8-bit data length section and an 8-bit to 128-bit or 512-bit length payload section.

The information on the transmission method for and the information on the gamma correction method for the HDR image data are inserted into the payload. When the information on the transmission method for and the information on the gamma correction method for the HDR image data are transmitted from the DP transmitter 301 to the DP receiver 307, "0b1000" is set to be in the command section of the header. Syntax Data that is expressed as "Metadata_tx", as illustrated in FIG. 25(*b*), is set to be in the payload section.

"Continuation flag" is a bit that indicates continuity when data length of the payload section of one packet is smaller than those of the information on the transmission method for and the information on the gamma correction method for the HDR image data that have to be transmitted and thus these pieces of information are divided into multiple packets and are transmitted. "Metadata_type" indicates a method that the DP receiver 307 selects, based on the pieces of information on the transmission method for and the gamma correction method for HDR image data that the DP transmitter 301 supports. "Metadata" sets the information on the transmission method for and the information on the gamma correction method for the HDR image data that are transmitted.

Furthermore, when the pieces of information on the transmission method for and the gamma correction method for the HDR image data that the DP receiver 307 supports are obtained, the DP transmitter 301 assigns "0b1001" to the command section of the header section. Syntax Data that is expressed as "EDID-read", as illustrated in FIG. 25(*c*), is set to be in the payload section. A byte length of data in the information on the transmission method for and the information on the gamma correction method for the HDR image data that are obtained is set to be in "HDR VSDB length". In this manner, also in the DP system 300, the information on the transmission method for and the information on the gamma correction method for the HDR image data can be transmitted in the same manner as in the AV system 10 in the HDMI.

[Example of a Structure of an MHL System]

Figure 26:
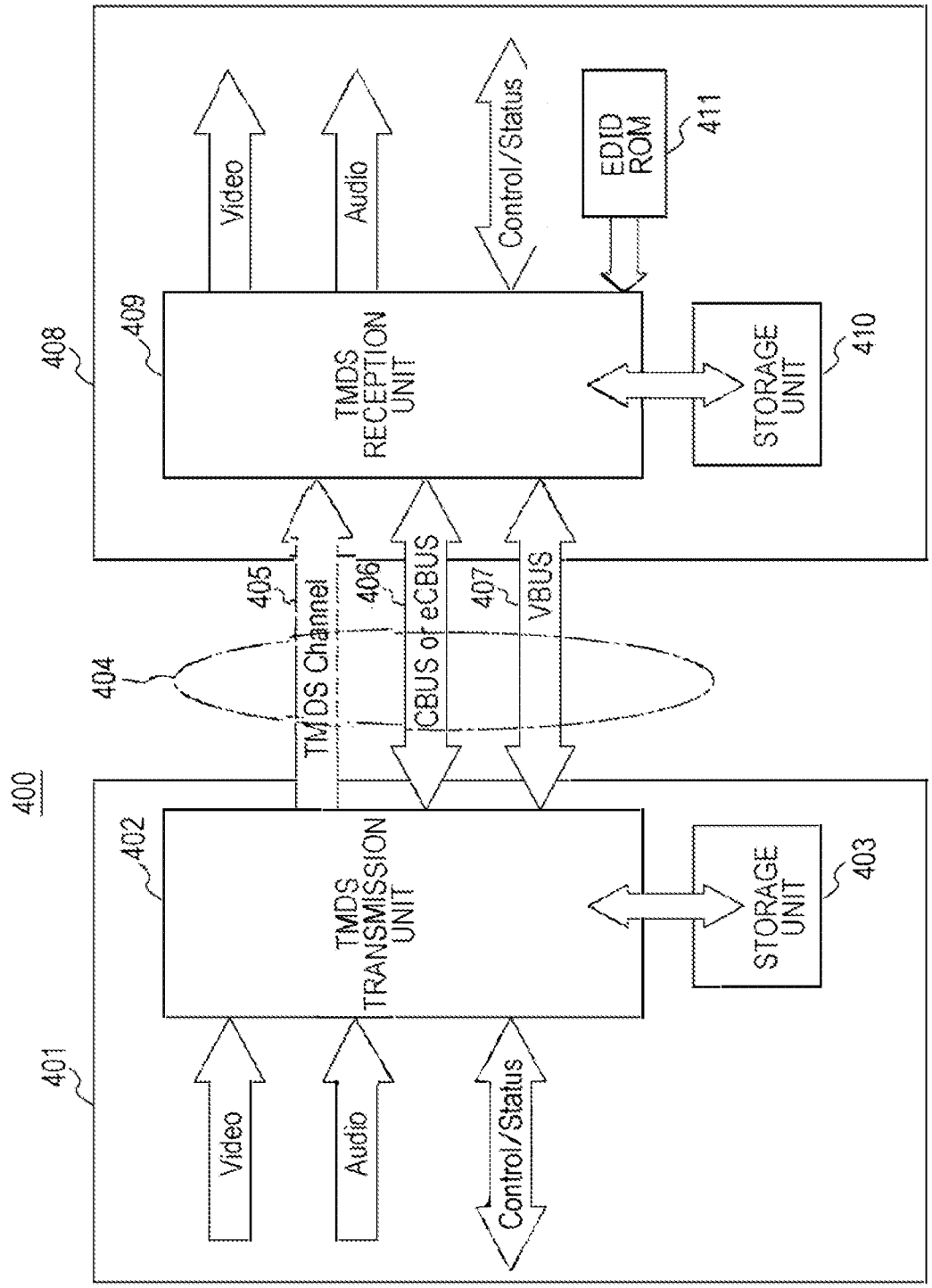
FIG. 26 is a block diagram illustrating a configuration example of an MHL system that uses an MHL interface.

FIG. 26 illustrates a configuration example of an MHL system 400 that uses an MHL interface. In the MHL system, an MHL transmitter 401 and an MHL receiver 408 are connected to each other with an MHL cable 404. In addition, the MHL transmitter 401 includes a TMDS transmission unit 402 and a storage unit 403, and the MHL receiver 408 includes an TMDS reception unit 409, a storage unit 410, and an EDID-ROM 411.

The MHL cable 404 is configured from a TMDS channel 405, an MHL Link Control Bus (CBUS)/enhanced MHL Link Control Bus (eCBUS) line 406, and a power supply MHL Voltage Bus (VBUS) line 407. The TMDS channel 405 is configured from one pair of differential signal pairs, and the transmission of the HDR image data, the information on the transmission method for and the information on the gamma information for the HDR image data is performed.

For a transmission data structure of the MHL interface, the TMDS transmission data structure (refer to FIG. 3) in the HDMI is used, and for HDR image data, the image data structure in the HDMI in FIGS. 7 to 9 is used. Furthermore, the information on the transmission method for and the information on the gamma correction for the HDR image data use the packet of which the data structure is the same as that of the VSIF packet (refer to FIG. 15) that is inserted during the control period 19 (refer to FIG. 3) in the HDMI and thus is transmitted.

Figure 27:
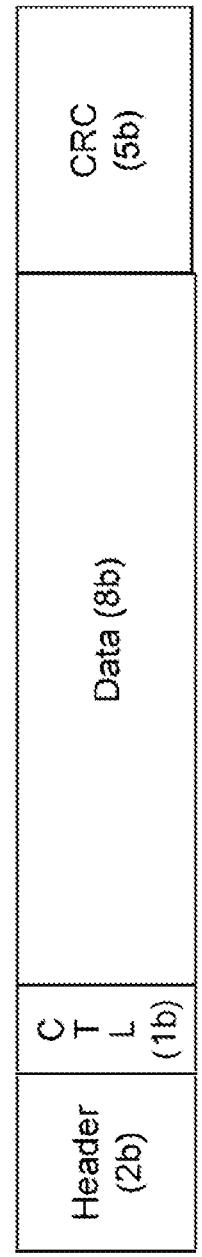
FIG. 27 is a diagram illustrating a CBUS packet format.

In the CBUS/eCBUS line 406, when a data section of packet data in FIG. 27 is set to 0x64, HPD indicates the high level "1", and when the data section of the packet data is set to 0x65, the HPD indicates the low level "0". Thus, the MHL transmitter 401 checks a connection to the MHL receiver 408 over the CBUS/eCBUS line 406.

Thereafter, using the CBUS/eCBUS line 406, the MHL transmitter 401 reads the HDR image information in the E-EDID from the MHL receiver 408 and recognizes the transmission method for the HDR image that the MHL receiver 408 supports. The data structure of the HDR image information in E-EDID in the MHL receiver 408 may be the same in FIGS. 13 and 14.

[Example of a Data Structure of the CBUS Line]

FIG. 28(*a*) illustrates a CBUS packet format in a case where the transmission of the information on the transmission method for and the information on the gamma correction for the HDR image data over the CBUS/eCBUS line 406 is performed. Usually, because the packet that is transmitted over the CBUS/eCBUS line 406 is transmitted by multiplexing in a time division manner the data that is one byte in data length, a delay occurs when the data that is great in data length is transmitted such as the information on the transmission method for and the information on the gamma correction for the HDR image data, and the CBUS/eCBUS line 406 is unsuitable for the data transmission that requires real-time transmission. Then, a "Block Protocol" of an enhanced MHL-specific communication (eMSC) is used that can block-transmit up to 256-byte data. Such a packet is configured from a 2-byte request command section (0xFF), a response waiting NULL section, a START unit, a 256-byte payload section, a 2-byte CRC section, and a response waiting NULL section.

The information on the transmission method for and the information on the gamma correction for the HDR image data are inserted into the 256-byte payload section. Syntax data that is expressed as "Metadata_tx", as illustrated in FIG. 28(*b*), is set to be in the payload section. The "Metadata_type" indicates a method that the MHL transmitter 401 selects, based on the pieces of information on the transmission method for and the gamma correction method for the HDR image data that the MHL receiver 408 supports. The "Metadata" sets the information on the transmission method for and the information on the gamma correction method for the HDR image data that are transmitted. In this manner, also in the MHL system 400, the information on the transmission method for and the information on the gamma correction method for the HDR image data can be transmitted in the same manner as in the AV system 10 in the HDMI.

Furthermore, according to the embodiment, the example is illustrated in which the disk player 11 is used as the transmission apparatus (source apparatus) and the television receiver 12 is used as the reception apparatus (synchronized apparatus) but, of course, even though other transmission apparatuses and reception apparatuses are used, the present technology can be applied in the same manner.

Furthermore, the present technology can be configured as follows.

(1) A transmission apparatus including: a data transmission unit that transmits image data in a high dynamic range to an external apparatus over a transmission path; and an information transmission unit that transmits information on a transmission method for and/or information on gamma correction for the image data in the high dynamic range that is transmitted in the data transmission unit, to the external apparatus over the transmission path.

(2) The transmission apparatus according to (1), in which the data transmission unit transmits the image data in the high dynamic range to the external apparatus over the transmission path using a differential signal.

(3) The transmission apparatus according to (2), in which the information transmission unit inserts the information on the transmission method for and/or the information on the gamma correction for the image data in the high dynamic range that is transmitted in the data transmission unit, during a blanking period of the image data in the high dynamic range, and thus transmits the inserted information to the external apparatus.

(4) The transmission apparatus according to (2), in which the information transmission unit transmits the information on the transmission method for and/or the information on the gamma correction for the image data in the high dynamic range that is transmitted in the data transmission unit, to the external apparatus over a control data line that makes up the transmission path.

(5) The transmission apparatus according to (2), in which the information transmission unit transmits the information on the transmission method for and/or the information on the gamma correction for the image data in the high dynamic range that is transmitted in the data transmission unit, to the external apparatus over a bidirectional communication path that is configured from a predetermined line of the transmission path.

(6) The transmission apparatus according to (5), in which the bidirectional communication path is a pair of differential communication paths, and at least one of the differential communications paths in the pair has a function of receiving a connection state notification from the external apparatus using direct-current bias potential.

(7) The transmission apparatus according to any one of (1) to (6), in which the image data in the high dynamic range includes first data and second data, and in which the data transmission unit configures the first data and the second data into a picture format stipulated for a stereoscopic image, and transmits the picture format to the external apparatus over the transmission path.

(8) The transmission apparatus according to any one of (1) to (6), in which the image data in the high dynamic range includes first data and second data, and in which the data transmission unit transmits the first data, as a first frame image, to the external apparatus over the transmission path and transmits the second data, as a second frame image, to the external apparatus over the transmission path.

(9) The transmission apparatus according to any one of (1) to (6), in which the image data in the high dynamic range includes first data and second data, and in which the first data is low-order 8-bit data of the image data in the high dynamic range and the second data is high-order bit data of the image data in the high dynamic range, or the first data is high-order 8-bit data of the image data in the high dynamic range and the second data is low-order bit data of the image data in the high dynamic range.

(10) The transmission apparatus according to any one of (1) to (9), in which the information on the transmission method for and the information on the gamma correction for the image data in the high dynamic range that is transmitted in the data transmission unit include at least one, among information at a maximum white level exceeding 100%, of the image data in the high dynamic range, a bit value at the time of expression at a black level, a bit value at the time of expression at a 100% white level, a flag indicating whether or not processing for the high dynamic range is performed, a luminance level of a reception apparatus that is assumed at the time of the 100% white level, a luminance input level that is necessary for a luminance increase in an image in the high dynamic range, and an increase luminance output level that is necessary for the luminance increase in the image in the high dynamic range.

(11) The transmission apparatus according to any one of (1) to (10) further including: an information reception unit that receives the pieces of information on the transmission method for and/or the gamma correction method for the image data in the high dynamic range that the external apparatus is able to support, which are transmitted from the external apparatus over the transmission path; and a method selection unit that, based on the information on the transmission method and/or the information on the gamma correction method that are received in the information reception unit, selects a predetermined transmission method and/or a predetermined gamma correction method from among the transmission methods for and/or the gamma correction methods for the image data in the high dynamic range which the external apparatus is able to support, in which the data transmission unit transmits the image data in the high dynamic range in accordance with the transmission method and/or the gamma correction method that are selected in the method selection unit, to the external apparatus over the transmission path.

(12) A method of transmitting image data in a high dynamic range, including: a data transmission step of transmitting the image data in the high dynamic range to an external apparatus over a transmission path, and an information transmission step of transmitting information on a transmission method for and/or information on gamma correction for the image data in the high dynamic range which is transmitted in the data transmission step, to the external apparatus over the transmission path.

(13) A program for causing a computer to function as: data transmission means that transmits image data in a high dynamic range to an external apparatus over a transmission path; and information transmission means that transmits information on a transmission method for and/or information on gamma correction for the image data in the high dynamic range that is transmitted in the data transmission means, to the external apparatus over the transmission path.

(14) A reception apparatus including: a data reception unit that receives image data in a high dynamic range for displaying an image in the high dynamic range from an external apparatus over a transmission path; an information reception unit that receives information on a transmission method for and/or information on gamma correction for the image data in the high dynamic range that is received in the data reception unit, from the external apparatus; and a data processing unit that, based on the information on the transmission method and/or the information on the gamma correction that are received in the information reception unit, processes the image data in the high dynamic range that is received in the data reception unit.

(15) The reception apparatus according to (14), in which the data reception unit receives the image data in the high dynamic range from the external apparatus over the transmission path using a differential signal.

(16) The reception apparatus according to (15), in which the information reception unit extracts the information on the transmission method for and/or the information on the gamma correction for the image data in the high dynamic range from a blanking period of the image data in the high dynamic range that is received in the data reception unit.

(17) The reception apparatus according to (15), in which the information reception unit receives the information on the transmission method for and/or the information on the gamma correction for the image data in the high dynamic range that is received in the data reception unit, from the external apparatus over a control data line that makes up the transmission path.

(18) The reception apparatus according to (15), in which the information reception unit receives the information on the transmission method for and/or the information on the gamma correction for the image data in the high dynamic range that is received in the data reception unit, from the external apparatus over a bidirectional communication path that is configured from a predetermined line of the transmission path.

(19) The reception apparatus according to (18), in which the bidirectional communication path is a pair of differential communication paths, and at least one of the differential communications paths in the pair has a function of notifying the external apparatus of a connection state using direct-current bias potential.

(20) The reception apparatus according to any one of (14) to (19), in which the image data in the high dynamic range includes first data and second data, and in which the data transmission and reception unit receives the first data and the second data, which are configured into a picture format stipulated for a stereoscopic image, from the external apparatus over the transmission path.

(21) The reception apparatus according to any one of (14) to (19), in which the image data in the high dynamic range includes first data and second data, and in which the data transmission and reception unit receives the first frame image that is configured from the first data and the second frame image that is configured from the second data, from the external apparatus over the transmission path.

(22) The reception apparatus according to any one of (14) to (19), in which the image data in the high dynamic range includes first data and second data, and in which the first data is low-order 8-bit data of the image in the high dynamic range and the second data is high-order bit data of the image in the high dynamic range, or the first data is high-order 8-bit data of the image data in the high dynamic range and the second data is low-order bit data of the image data in the high dynamic range.

(23) The reception apparatus according to any one (14) to (22), further including: a display control unit that performs a display of whether or not to cancel an energy saving mode, on a display unit, when the information on the transmission method for the image data in the high dynamic range that is transmitted from the external apparatus is received in the information reception unit, if the energy saving mode is selected.

(24) The reception apparatus according to any one of (14) to (23), further including: an information storage unit in which the pieces of information on the transmission method for and/or the gamma correction method for the image data in the high dynamic range that the information storage unit itself is able to support are stored; and an information transmission unit that transmits the information on the transmission method and/or the information on the gamma correction method that are stored in the information storage unit, to the external apparatus over the transmission path.

(25) The reception apparatus according to (24), in which at least one, among information on maximum luminance at which a display is possible, information on a maximum increase luminance level at which processing for the high dynamic range is possible, and a flag for prohibiting increase processing, is further stored in the information storage unit.
(26) The reception apparatus according to (24) or (25), further including: a storage control unit that rewrites a flag for prohibiting increase processing, as invalid, which is stored in the information storage unit, if the flag for prohibiting the increase processing is stored in the information storage unit and an energy saving mode is selected.
(27) The reception apparatus according to any one of (24) to (26), further including: a storage control unit that rewrites information on maximum luminance at which the display is possible and information on a maximum increase luminance level at which processing for the high dynamic range is possible, which are stored in the information storage unit, if the information on the maximum luminance at which the display is possible and the information on the maximum increase luminance level at which the processing for the high dynamic range is possible are stored in the information storage unit and an energy saving mode is selected.
(28) A method of receiving image data in a high dynamic range, including: a data reception step of enabling a data reception unit to receive the image data in the high dynamic range from an external apparatus over a transmission path; an information reception step of receiving information on a transmission method for and/or information on gamma correction for the image data in the high dynamic range that is received in the data reception step, from the external apparatus and a data processing step of processing the image data in the high dynamic range that is received in the data reception step, based on the information on the transmission method for and/or the information on the gamma correction that are received in the information reception step.
(29) A program for causing a computer to function as: data reception means that receives image data in a high dynamic range for displaying an image in the high dynamic range from an external apparatus over a transmission path; information reception means that receives information on a transmission method for and/or information on gamma correction for the image data in the high dynamic range that is received in the data reception unit, from the external apparatus; and a data processing means that processes the image data in the high dynamic range that is received in the data reception means, based on the information on the transmission method and/or the information on the gamma correction that are received in the information reception means.

REFERENCE SIGNS LIST

10 AV SYSTEM
11 DISK PLAYER
11a HDMI TERMINAL
11b HDMI TRANSMISSION UNIT
11c HIGH-SPEED BUS INTERFACE
12 TELEVISION RECEIVER
12a HDMI TERMINAL
12b HDMI RECEPTION UNIT
12c HIGH-SPEED BUS INTERFACE
13 HDMI CABLE
14 EFFECTIVE IMAGE PERIOD
15 HORIZONTAL BLANKING PERIOD
16 VERTICAL BLANKING PERIOD
17 VIDEO DATA PERIOD
18 DATA ISLAND PERIOD
19 CONTROL PERIOD
21 HDMI TRANSMITTER
22 HDMI RECEIVER
23 DDC LINE
24 CEC LINE
25 HPD LINE
26 POWER SOURCE LINE
27 RESERVE LINE
104 CPU
105 INTERNAL BUS
106 FLASH ROM
107 SDRAM
108 REMOTE CONTROL RECEPTION UNIT
109 REMOTE CONTROL TRANSMISSION UNIT
110 SATA INTERFACE
111 BD DRIVE
112 ETHERNET INTERFACE
113 NETWORK TERMINAL
114 HDR PROCESSING CIRCUIT
115 MPEG DECODER
116 GRAPHICS GENERATION CIRCUIT
117 PICTURE OUTPUT TERMINAL
118 VOICE OUTPUT TERMINAL
121 DISPLAY CONTROL UNIT
122 PANEL DRIVE CIRCUIT
123 DISPLAY PANEL
124 POWER SOURCE UNIT
204 HDR PROCESSING CIRCUIT
205 ANTENNA TERMINAL
206 DIGITAL TUNER
207 MPEG DECODER
208 PICTURE SIGNAL PROCESSING CIRCUIT
209 GRAPHICS GENERATION CIRCUIT
210 PANEL DRIVE CIRCUIT
211 DISPLAY PANEL
212 VOICE SIGNAL PROCESSING CIRCUIT
213 VOICE AMPLIFICATION CIRCUIT
214 SPEAKER
220 INTERNAL BUS
221 CPU
222 FLASH ROM
223 DRAM
224 ETHERNET INTERFACE
225 NETWORK TERMINAL
226 REMOTE CONTROL RECEPTION UNIT
227 REMOTE CONTROL TRANSMISSION UNIT
231 DISPLAY CONTROL UNIT
232 POWER SOURCE UNIT
300 DP SYSTEM
301 DP TRANSMITTER
302 DP TRANSMISSION UNIT
303 DP CABLE
304 MAIN LINK
305 AUX CHANNEL
306 HOT PLUG DETECTION
307 DP RECEIVER
308 DP RECEPTION UNIT
309 STORAGE UNIT
400 MHL SYSTEM
401 MHL TRANSMITTER
402 TMDS TRANSMISSION UNIT
403 STORAGE UNIT
404 MHL CABLE
405 TMDS CHANNEL

406 CBUS/eCBUS LINE
407 VBUS LINE
408 MHL RECEIVER
409 TMDS RECEPTION UNIT
410 STORAGE UNIT
411 EDID ROM

The invention claimed is:

1. A reception apparatus comprising:
circuitry configured to:
transmit over a transmission path to a transmission apparatus information on a gamma correction method for image video data that the reception apparatus is able to support,
  receive image video data for displaying an image over the transmission path from the transmission apparatus, the image video data received in accordance with the gamma correction method supported by the reception apparatus;
  receive information on a gamma correction for the image video data over the transmission path from the transmission apparatus; and
  based on the information on the gamma correction that is received, process the received image video data,
  wherein the information on the gamma correction for the image video data includes an indication of the gamma correction method.

2. The reception apparatus according to claim 1, wherein the received image video data is received using a differential signal.

3. The reception apparatus according to claim 1, wherein the image video data is HDR data.

4. The reception apparatus according to claim 1, wherein the information includes an indication of the gamma correction method that is stored in an information storage unit of the reception apparatus.

5. The reception apparatus according to claim 1, wherein the information includes an indication of an amount of the gamma correction data and gamma correction data in accordance with the gamma correction method.

6. The reception apparatus according to claim 5, further comprises a display panel, wherein the display panel has a maximum luminance value capability and the reception apparatus receives the information according to the maximum luminance value.

7. The reception apparatus according to claim 1, wherein the information includes gamma correction data in accordance with the gamma correction method.

8. The reception apparatus according to claim 1, wherein the information on the gamma correction method includes more than one method of the gamma correction.

9. The reception apparatus according to claim 8, wherein one of the methods involves compliance with a deep color transmission format.

10. The reception apparatus according to claim 8, wherein one of the methods involves compliance with a stereoscopic image data format.

11. The reception apparatus according to claim 8, wherein one of the methods involves compliance with a high frame graphics format.

12. The reception apparatus according to claim 1, wherein the circuitry comprises more than one unit of the reception apparatus integrated into one chip.

13. The reception apparatus according to claim 1, wherein a maximum luminance information is in terms of cd/m2 for displaying an image in high dynamic range and is stored in the reception apparatus.

14. The reception apparatus according to claim 1, further comprising a display panel for displaying the processed image video data.

15. The reception apparatus according to claim 1, wherein the information on the gamma correction is included in a data structure of an EDID.

16. The reception apparatus according to claim 1, wherein different bytes of an information structure of the image video data are assigned to each of method of a group of potential transmission methods.

17. The reception apparatus according to claim 16, wherein the information structure is included in a Vendor Specific InfoFrame.

18. The reception apparatus according to claim 17, wherein the Vendor Specific InfoFrame incorporates a calculation formula for the processing of the image video data.

19. The reception apparatus according to claim 1, wherein a specific bytes of an information structure of the image video data is assigned to a specific transmission method of a group of potential transmission methods.

20. The reception apparatus according to claim 19, wherein the information structure is included in a Vendor Specific InfoFrame.

* * * * *